United States Patent
Klontz

(10) Patent No.: US 11,354,422 B2
(45) Date of Patent: Jun. 7, 2022

(54) OPTIMIZATIONS FOR PRIVACY-PRESERVING DISTANCE METRIC COMPUTATION

(71) Applicant: Rank One Computing Corporation, Denver, CO (US)

(72) Inventor: Joshua C. Klontz, Denver, CO (US)

(73) Assignee: Rank One Computing Corporation, Denver, CO (US)

( * ) Notice: Subject to any disclaimer, the term of this patent is extended or adjusted under 35 U.S.C. 154(b) by 350 days.

(21) Appl. No.: 16/672,100

(22) Filed: Nov. 1, 2019

(65) Prior Publication Data

US 2020/0143066 A1     May 7, 2020

Related U.S. Application Data

(60) Provisional application No. 62/754,796, filed on Nov. 2, 2018.

(51) Int. Cl.
    *G06F 21/60*     (2013.01)
    *H04L 9/00*      (2022.01)
    (Continued)

(52) U.S. Cl.
    CPC ............ *G06F 21/602* (2013.01); *G06F 17/16* (2013.01); *H04L 9/006* (2013.01); *H04L 9/0656* (2013.01);
    (Continued)

(58) Field of Classification Search
    CPC ....... G06F 21/602; G06F 21/606; H04L 9/08; H04L 9/3231
    See application file for complete search history.

(56) References Cited

U.S. PATENT DOCUMENTS

| | | | |
|---|---|---|---|
| 2012/0131350 A1* | 5/2012 | Atherton | H04L 9/3231 713/186 |
| 2012/0207299 A1* | 8/2012 | Hattori | H04L 9/3073 380/30 |

(Continued)

FOREIGN PATENT DOCUMENTS

EP     3435591 A1 *   1/2019   ........... G06F 16/951

OTHER PUBLICATIONS

Wang et al., An Efficient Private-Preserving Palmprint Authentication Scheme Based on Homomorphic Encryption, 2017, Springer International Publishing, pp. 503-512 (Year: 2017).*

(Continued)

*Primary Examiner* — Ellen Tran
(74) *Attorney, Agent, or Firm* — Adsero IP

(57) ABSTRACT

Novel tools and techniques are provided for implementing signal encryption or signal authentication. In various embodiments, a second computing system might pack, using a packing function, two or more elements of a second vector associated with a third entity to generate a packed second vector; might individually encrypt, using a generated public key received from a first computing system, each element of the packed second vector to generate an encrypted packed second vector; might pack two or more elements of an encrypted first vector from the first computing system to generate a packed encrypted first vector; might combine the encrypted packed second vector with the packed encrypted first vector to generate a combined packed encrypted vector; and might send the combined packed encrypted vector to the first computing system for generating a similarity score that is indicative of differences between the second vector and the first vector.

18 Claims, 9 Drawing Sheets

(51) Int. Cl.
*G06F 17/16* (2006.01)
*H04L 9/06* (2006.01)
(52) U.S. Cl.
CPC ...... *H04L 2209/08* (2013.01); *H04L 2209/56* (2013.01)

(56) References Cited

U.S. PATENT DOCUMENTS

| | | | | |
|---|---|---|---|---|
| 2014/0247939 | A1* | 9/2014 | Hattori | H04L 9/30 380/44 |
| 2016/0065571 | A1* | 3/2016 | Hoyos | H04L 63/0435 713/168 |
| 2016/0316360 | A1* | 10/2016 | Rainisto | H04W 12/033 |
| 2016/0373440 | A1* | 12/2016 | Mather | H04L 63/0861 |
| 2020/0279269 | A1* | 9/2020 | Wagner | G09C 1/00 |

OTHER PUBLICATIONS

Torres et al., Effectiveness of Fully Homomorphic Encryption to Preserve the Privacy of Biometric Data, 2014, ACM, pp. 1-7 (Year: 2014).*

Leng et al., A remote cancelable palmprint authentication protocol based on multi-directional two-dimensional PalmPhasor-fusion, 2012 published by Wiley Online Library, pp. 1860-1871 (Year: 2012).*

Amirbekyan and Estivill-Castro, "A New Efficient Privacy-Preserving Scalar Product Protocol," Proceedings of the Sixth Australasian Conference on Data Mining and Analytics (2007) 70:209-214.

* cited by examiner

OPTIMIZATIONS FOR PRIVACY-PRESERVING DISTANCE METRIC COMPUTATION

CROSS-REFERENCES TO RELATED APPLICATIONS

This application claims priority to U.S. Patent Application Ser. No. 62/754,796 (the "'796 Application"), filed Nov. 2, 2018 by Joshua Klontz, entitled, "Optimizations for Privacy-Preserving Distance Metric Computation," the disclosure of which is incorporated herein by reference in its entirety for all purposes.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing signal encryption or signal authentication, and, more particularly, to methods, systems, and apparatuses for implementing signal encryption or signal authentication that enables measuring a distance or a similarity value between two fixed-length signals without disclosing the contents of the signals, particularly as the signals pertain to biometric signals or signals containing biometric data.

BACKGROUND

Biometric authentication is a rapidly growing technology that is increasingly used in day-to-day life to unlock mobile devices, to validate identities when using online services, to provide access to secure facilities, to authorize payments, and to support a wide range of other activities requiring confirmation of a person's identity.

Biometrics have many practical advantages over other identity validation methods, such as passwords, keys, and/or tokens, or the like. The primary three biometric modalities (i.e., face, fingerprint, and iris) are all easy for the user to provide and enable accurate identification.

However, a chief limitation of biometrics is that a person cannot change or replace their biometrics. Thus, while passwords can be reset and keys can be changed, one cannot practically change their iris, fingerprint, or facial biometric data if an unwanted person has gained access to these samples.

As payments and other identity verification methods switch to, or are augmented by, biometrics, there is increasing concern that the operators of biometric authentication devices could gain access to users' biometric samples and features derived from such samples, which are collectively referred to as "templates." Similarly, as biometric samples and/or features are stored on smart-cards or other media for use as the reference identity when a person presents themselves for live identity verification, this data can be easily compromised if not stored in a secure manner. Finally, as biometric templates are stored in central databases, a security breach of these databases could cause significant harm if the templates are not properly protected.

One approach to protecting biometric templates from unwanted access is to apply traditional data encryption to sample or features. Thus, the templates would be encrypted while at rest, and then decrypted when used for matching. However, this approach is limited in that the template values will be exposed after decryption. Thus, at the time of matching, a strong attack vector still exists.

To prevent this issue from occurring, while still enabling biometric identity validation, a need exists for methods to obfuscate or encrypt the templates within the system such that at no point in the process can an outside party, or any party performing the comparison, gain access to their underlying values. More specifically, a method for encryption is needed where the similarity and/or distance between two biometric templates can occur within the encrypted domain, thus preventing the need to ever decrypt the template values. Such an encrypted matching method must satisfy the following three characteristics: revocable, non-invertible, and non-linkable.

A revocable biometric template encryption method means that if multiple encrypted biometric samples were collected from the same person then the encrypted template values would be sufficiently different. Thus, new encrypted templates can be issued if the existing encrypted templates are compromised.

A non-invertible biometric template encryption method means even with knowledge of the underlying encryption scheme, it is computationally intractable to decrypt a template via brute force attempts.

Finally, a non-linkable biometric template encryption method means that different systems can encrypt templates in a different manner (e.g., using different encryption keys), thus preventing a biometric template in one system from being linked to the same person's template in another system.

Biometric template encryption schemes can be bifurcated by the following distinction: lossless versus lossy. In the case of lossy biometric template encryption, the accuracy of biometric recognition using the encryption scheme is decreased as compared to the same biometric recognition system without encryption. For lossless biometric template encryption, there is no change in accuracy when using the encryption scheme.

As accuracy is a critical requirement in any biometric system, there is a strong preference for lossless biometric template encryption schemes. One known approach in this regard is the "Permutation Protocol," which applies a re-ordering of template feature dimensions in conjunction with encryption of the underlying values for each feature dimension. While this approach is quite powerful and can generalize to most distance metrics that are computed using biometric templates, it is a computationally demanding technique that is often too laborious (and thus costly) to meet the requirements of real-world applications, particularly those running on embedded devices.

Hence, there is a need for more robust and scalable solutions for implementing signal encryption or signal authentication, and, more particularly, for methods, systems, and apparatuses for implementing signal encryption or signal authentication that enables measuring a distance or a similarity value between two fixed-length signals without disclosing the contents of the signals, particularly as the signals pertain to biometric signals or signals containing biometric data.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
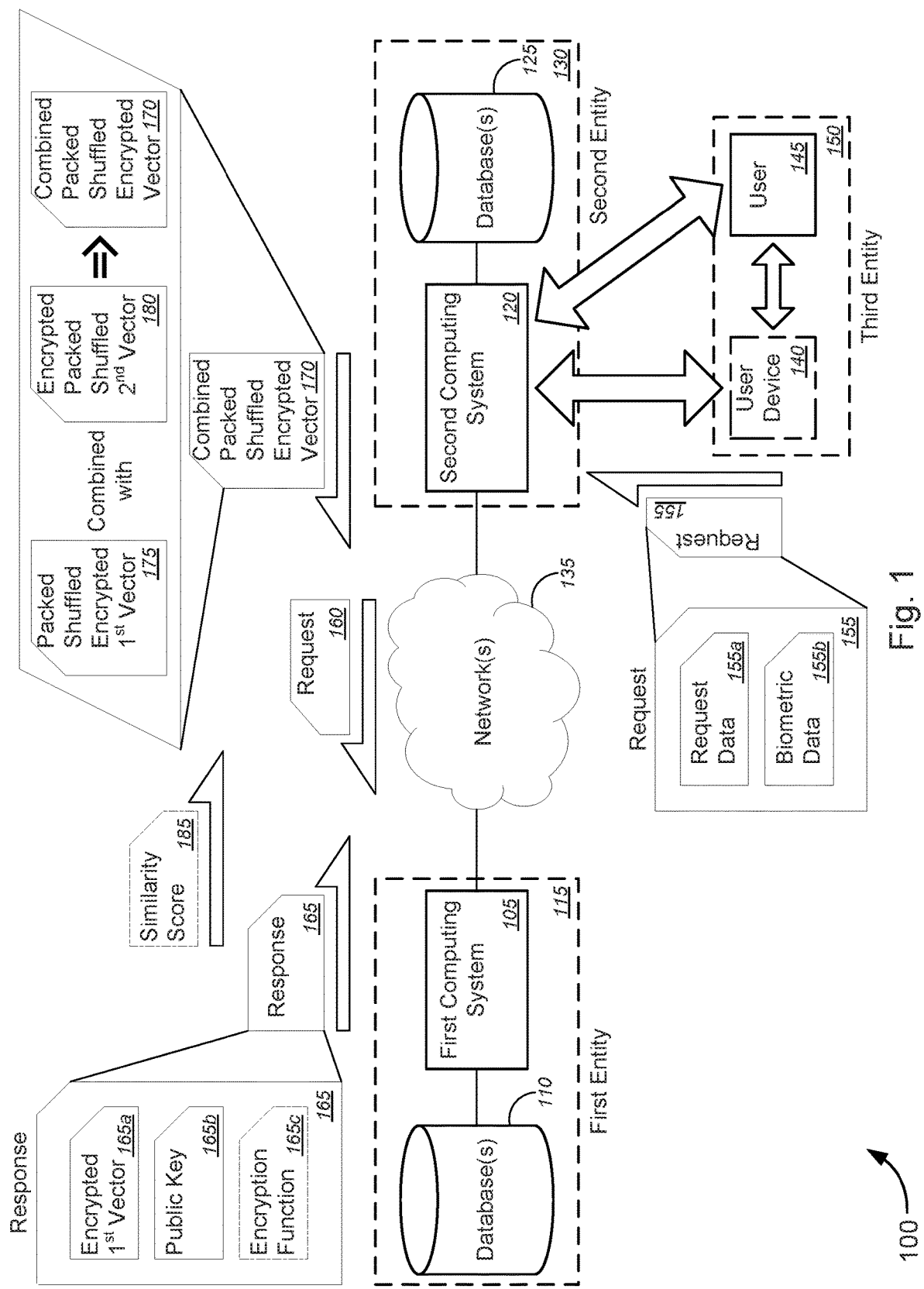
FIG. 1 is a schematic diagram illustrating a system for implementing signal encryption or signal authentication that enables measuring a distance or a similarity value between two fixed-length signals without disclosing the contents of the signals, in accordance with various embodiments.

Various embodiments provide tools and techniques for implementing signal encryption or signal authentication, and, more particularly, methods, systems, and apparatuses for implementing signal encryption or signal authentication that enables measuring a distance or a similarity value between two fixed-length signals without disclosing the contents of the signals, particularly as the signals pertain to biometric signals or signals containing biometric data.

In various embodiments, a user or third entity might request access or authentication via a second computing system associated with a second entity, might request access or authentication via a user device communicating with the second computing system, or might otherwise send a request for a first computing system to perform one or more tasks, and/or the like. In some cases, the request might include, without limitation, request data and biometric data. In some embodiments, the request data might comprise information pertaining to the request for access, including, but not limited to, at least one of request for access to content, request for access to data, request for access to user profiles, request to authorize payment, request to unlock mobile devices, request to validate identities when using online services, request for access to financial information, request for access to financial assets, request for access to transfer financial assets, request for access to property assets, request for access to transfer property assets, request for access to digital assets, request for access to transfer digital assets, request for access to secure facilities, name of the user, password of the user, or answers of the user to security questions, and/or the like. According to some embodiments, the biometric data might include, but is not limited to, at least one of face pattern data, fingerprint pattern data, or iris pattern data, and/or the like. In response to receiving the request from the user or third entity, the second computing system might request or establish secure communications with the first computing system via a network(s). After the second computing system has established secure communications with the first computing system via the network(s), the second computing system might send a request to the first computing system via the network(s). In some instances, the request might include the request data, without including the biometric data.

The first computing system associated with a first entity might receive, from the second computing system (in some cases, via the network(s)), a first request on behalf of the user, the second entity, or the third entity. In some embodiments, the first request might include, but is not limited to, a request for access or authentication on behalf of the user, the second entity, or the third entity; a request to connect with the first computing system, a request to send data (e.g., combined packed shuffled encrypted vectors, or the like); or a request to perform one or more tasks; and/or the like. In some instances, the one or more tasks might include, but is not limited to, providing the user, the second entity, or the third entity with access to at least one of content, data, user profiles, devices, accounts, services, or financial assets, and/or the like; authenticating the user, the second entity, or the third entity; allowing the second computing system to send data (e.g., combined packed shuffled encrypted vectors, or the like); and/or the like. In some cases, the first computing system might generate an encryption key pair comprising a public key and a private key. The first computing system might individually encrypt, using the public key and an encryption function, each element of a first vector associated with the user or third entity to generate an encrypted first vector. The first computing system might send the encrypted first vector and the public key to the second computing system, via the network(s).

The second computing system might receive the encrypted first vector and the public key. The second computing system might shuffle, using a permutation function, elements of a second vector associated with the user or the third entity to generate a shuffled second vector; might pack, using a packing function, two or more elements of the shuffled second vector to generate a packed shuffled second vector, the packed shuffled second vector having fewer elements than the shuffled second vector; might individually encrypt, using the received public key, each element of the packed shuffled second vector to generate an encrypted packed shuffled second vector; might shuffle, using the permutation function, corresponding elements of the encrypted first vector to generate a shuffled encrypted first vector; might pack, using the packing function, two or more elements of the shuffled encrypted first vector to generate a packed shuffled encrypted first vector, the two or more elements of the shuffled encrypted first vector corresponding to the two or more elements of the shuffled second vector; might combine the encrypted packed shuffled second vector with the packed shuffled encrypted first vector to generate a combined packed shuffled encrypted vector; and might send the combined packed shuffled encrypted vector to the first computing system, via the network(s).

According to some embodiments, shuffling the elements and corresponding elements of the second vector and the encrypted first vector using the permutation function might comprise randomly or pseudo-randomly shuffling the elements and corresponding elements of the second vector and the encrypted first vector using the permutation. In some instances, the first vector might comprise a plurality of elements including, but not limited to, two or more elements having identical values, and individually encrypting each element of the first vector associated with the user or third entity to generate the encrypted first vector might comprise individually encrypting one of the two or more elements having identical values, duplicating the encryption for each of the other of the two or more elements, and individually encrypting each of the other elements among the plurality of elements.

In some embodiments, combining the encrypted packed shuffled second vector with the packed shuffled encrypted first vector (or vice versa) might comprise at least one of performing an encrypted vector subtraction of the encrypted packed shuffled second vector from the packed shuffled encrypted first vector, performing an encrypted vector addition of the encrypted packed shuffled second vector to the packed shuffled encrypted first vector, dividing the packed shuffled encrypted first vector by the encrypted packed shuffled second vector, or multiplying the packed shuffled encrypted first vector by the encrypted packed shuffled second vector, and/or the like.

The first computing system might receive the combined packed shuffled encrypted vector; might individually decrypt, using the private key and a decryption function, each element of the combined packed shuffled encrypted vector to generate a combined packed shuffled decrypted vector; might unpack, using an unpacking function (corresponding to the packing function), the combined packed shuffled decrypted vector to generate a combined shuffled decrypted vector; and might generate a similarity score based on the combined shuffled decrypted vector, the similarity score being indicative of differences between the second vector and the first vector. In some embodiments, based on a determination that the similarity score exceeds a threshold value, the first computing system might perform one or more tasks in response to the first request. According to some embodiments, the one or more tasks might include, but is not limited to, providing the user, the second entity, or the third entity with access to at least one of content, data, user profiles, devices, accounts, services, or financial assets, and/or the like; authenticating the user, the second entity, or the third entity; allowing the second computing system to send data (e.g., combined packed shuffled encrypted vectors, or the like); and/or the like. Based on a determination that the similarity score does not exceed the threshold value, the first computing system might deny the first request. According to some embodiments, the first computing system might use the similarity score either for its own internal purposes or for extraneous purposes. In some cases, the first computing system might optionally send the similarity score to the second computing system or the user device, via the network(s).

In accordance with the various embodiments described herein, the signal encryption or signal authentication techniques and systems herein allow for more secure signal encryption or signal authentication by performing comparisons (and thus authentication) while in the encrypted space without risking sensitive data being left in the unencrypted or decrypted space, by shuffling sub-vectors of "plaintext" vectors or decrypted/unencrypted vectors (rather than "ciphertext" vectors or encrypted vectors) to prevent reverse engineering or figuring out vectors, by packing vectors to reduce the number of encryptions required (each of which is computationally expensive), and/or by streamlining repeated or duplicate sub-vectors or feature vector dimensions by encrypting only one of the repeated or duplicate sub-vectors or feature vector dimensions, or the like.

These and other aspects of signal encryption or signal authentication enable measuring a distance or a similarity value between two fixed-length signals without disclosing the contents of the signals, particularly as the signals pertain to biometric signals or signals containing biometric data, as described below in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, signal encryption technology, signal authentication technology, and/or the like. In other aspects, certain embodiments, can improve the functioning of user equipment or systems themselves (e.g., signal encryption systems, signal authentication systems, etc.), for example, by receiving, from a first computing system associated with a first entity and using a second computing system associated with a second entity, an encrypted first vector and a generated public key in response to sending a first request to the first computing system on behalf of the second entity or a third entity; shuffling, with the second computing system and using a permutation function, elements of a second vector associated with the third entity to generate a shuffled second vector; packing, with the second computing system and using a packing function, two or more elements of the shuffled second vector to generate a packed shuffled second vector, the packed shuffled second vector having fewer elements than the shuffled second vector; individually encrypting, with the second computing system and using the received generated public key, each element of the packed shuffled second vector to generate an encrypted packed shuffled second vector; shuffling, with the second computing system and using the permutation function, corresponding elements of the encrypted first vector to generate a shuffled encrypted first vector; packing, with the second computing system and using the packing function, two or more elements of the shuffled encrypted first vector to generate a packed shuffled encrypted first vector, the two or more elements of the shuffled encrypted first vector corresponding to the two or more elements of the shuffled second vector; combining, with the second computing system, the encrypted packed shuffled second vector with the packed shuffled encrypted first vector to generate a combined packed shuffled encrypted vector; and sending, with the second computing system, the combined packed shuffled encrypted vector to the first computing system for the first computing system to generate a similarity score that is indicative of differences between the second vector and the first vector; and/or the like.

In particular, to the extent any abstract concepts are present in the various embodiments, those concepts can be implemented as described herein by devices, software, systems, and methods that involve specific novel functionality (e.g., steps or operations), such as, receiving, from a first computing system associated with a first entity and using a second computing system associated with a second entity, an encrypted first vector and a generated public key in response to sending a first request to the first computing system on behalf of the second entity or a third entity; shuffling, with the second computing system and using a permutation function, elements of a second vector associated with the third entity to generate a shuffled second vector; packing, with the second computing system and using a packing function, two or more elements of the shuffled second vector to generate a packed shuffled second vector, the packed shuffled second vector having fewer elements than the shuffled second vector; individually encrypting, with the second computing system and using the received generated public key, each element of the packed shuffled second vector to generate an encrypted packed shuffled second vector; shuffling, with the second computing system and using the permutation function, corresponding elements of the encrypted first vector to generate a shuffled encrypted first vector; packing, with the second computing system and using the packing function, two or more elements of the shuffled encrypted first vector to generate a packed shuffled encrypted first vector, the two or more elements of the shuffled encrypted first vector corresponding to the two or more elements of the shuffled second vector; combining, with the second computing system, the encrypted packed shuffled second vector with the packed shuffled encrypted first vector to generate a combined packed shuffled encrypted vector; and sending, with the second computing system, the combined packed shuffled encrypted vector to the first computing system for the first computing system to generate a similarity score that is indicative of differences between the second vector and the first vector; and/or the like, to name a few examples, that extend beyond mere conventional computer processing operations. These functionalities can produce tangible results outside of the implementing computer system, including, merely by way of example, allowing for more secure signal encryption or signal authentication by performing comparisons (and thus authentication) while in the encrypted space without risking sensitive data being in left in the unencrypted or decrypted space, by shuffling sub-vectors of "plaintext" vectors or decrypted/unencrypted vectors (rather than "ciphertext" vectors or encrypted vectors) to prevent reverse engineering or figuring out vectors, by packing vectors to reduce the number of encryptions required (each of which is computationally expensive), and/or by streamlining repeated or duplicate sub-vectors or feature vector dimensions by encrypting only one of the repeated or duplicate sub-vectors or feature vector dimensions, and/or the like, at least some of which may be observed or measured by users and/or service providers.

In an aspect, a method might comprise receiving, with a first computing system associated with a first entity and from a second computing system associated with a second entity, a first request on behalf of the second entity or a third entity; generating, with the first computing system, an encryption key pair comprising a public key and a private key; individually encrypting, with the first computing system and using the public key and an encryption function, each element of a first vector associated with the third entity to generate an encrypted first vector; and sending, with the first computing system, the encrypted first vector and the public key to the second computing system.

The method might also comprise receiving, with the second computing system, the encrypted first vector and the public key; shuffling, with the second computing system and using a permutation function, elements of a second vector associated with the third entity to generate a shuffled second vector; packing, with the second computing system and using a packing function, two or more elements of the shuffled second vector to generate a packed shuffled second vector, the packed shuffled second vector having fewer elements than the shuffled second vector; individually encrypting, with the second computing system and using the received public key, each element of the packed shuffled second vector to generate an encrypted packed shuffled second vector; shuffling, with the second computing system and using the permutation function, corresponding elements of the encrypted first vector to generate a shuffled encrypted first vector; packing, with the second computing system and using the packing function, two or more elements of the shuffled encrypted first vector to generate a packed shuffled encrypted first vector, the two or more elements of the shuffled encrypted first vector corresponding to the two or more elements of the shuffled second vector; combining, with the second computing system, the encrypted packed shuffled second vector with the packed shuffled encrypted first vector to generate a combined packed shuffled encrypted vector; and sending, with the second computing system, the combined packed shuffled encrypted vector to the first computing system.

The method might further comprise receiving, with the first computing system, the combined packed shuffled encrypted vector; individually decrypting, with the first computing system and using the private key and a decryption function, each element of the combined packed shuffled encrypted vector to generate a combined packed shuffled decrypted vector; unpacking, with the first computing system and using an unpacking function corresponding to the packing function, the combined packed shuffled decrypted vector to generate a combined shuffled decrypted vector; generating, with the first computing system, a similarity score based on the combined shuffled decrypted vector, the similarity score being indicative of differences between the second vector and the first vector; and based on a determination that the similarity score exceeds a threshold value, performing, with the first computing system, one or more tasks in response to the first request. In some cases, the first vector might comprise a plurality of elements comprising two or more elements having identical values, wherein individually encrypting each element of the first vector associated with the third entity to generate the encrypted first vector might comprise individually encrypting one of the two or more elements having identical values, duplicating the encryption for each of the other of the two or more elements, and individually encrypting each of the other elements among the plurality of elements.

In another aspect, a method might comprise receiving, from a first computing system associated with a first entity and using a second computing system associated with a second entity, an encrypted first vector and a generated public key in response to sending a first request to the first computing system on behalf of the second entity or a third entity; packing, with the second computing system and using a packing function, two or more elements of a second vector associated with the third entity to generate a packed second vector, the packed second vector having fewer elements than the second vector; individually encrypting, with the second computing system and using the received generated public key, each element of the packed second vector to generate an encrypted packed second vector; packing, with the second computing system and using the packing function, two or more elements of the encrypted first vector to generate a packed encrypted first vector, the two or more elements of the encrypted first vector corresponding to the two or more elements of the second vector; combining, with the second computing system, the encrypted packed second vector with the packed encrypted first vector to generate a combined packed encrypted vector; and sending, with the second computing system, the combined packed encrypted vector to the first computing system for the first computing system to generate a similarity score that is indicative of differences between the second vector and the first vector.

In some embodiments, the method might further comprise, prior to packing the two or more elements of the second vector, shuffling, with the second computing system and using a permutation function, elements of the second vector to generate a shuffled second vector. Packing the two or more elements of the second vector might comprise packing, with the second computing system and using the packing function, two or more elements of the shuffled second vector to generate a packed shuffled second vector, the packed shuffled second vector having fewer elements than the shuffled second vector. Individually encrypting each element of the packed second vector might comprise individually encrypting, with the second computing system and using the received generated public key, each element of the packed shuffled second vector to generate an encrypted packed shuffled second vector.

The method might further comprise, prior to packing the two or more elements of the encrypted first vector, shuffling, with the second computing system and using the permutation function, corresponding elements of the encrypted first vector to generate a shuffled encrypted first vector. Packing the two or more elements of the encrypted first vector might comprise packing, with the second computing system and using the packing function, two or more elements of the shuffled encrypted first vector to generate a packed shuffled encrypted first vector, the two or more elements of the shuffled encrypted first vector corresponding to the two or more elements of the shuffled second vector. Combining the encrypted packed second vector with the packed encrypted first vector might comprise combining, with the second computing system, the encrypted packed shuffled second vector with the packed shuffled encrypted first vector to generate a combined packed shuffled encrypted vector. Sending the combined packed encrypted vector to the first computing system might comprise sending, with the second computing system, the combined packed shuffled encrypted vector to the first computing system for the first computing system to generate the similarity score that is indicative of differences between the second vector and the first vector.

According to some embodiments, the method might further comprise receiving, with the first computing system associated with the first entity and from the second computing system associated with the second entity, the first request on behalf of the second entity or the third entity; individually encrypting, with the first computing system and using an encryption function and the generated public key, each element of a first vector associated with the third entity to generate the encrypted first vector; and sending, with the first computing system, the encrypted first vector and the generated public key to the second computing system.

The method might further comprise receiving, with the first computing system and from the second computing system, the combined packed shuffled encrypted vector; individually decrypting, with the first computing system and using a decryption function and a generated private key corresponding to the generated public key, each element of the combined packed shuffled encrypted vector to generate a combined packed shuffled decrypted vector; unpacking, with the first computing system and using an unpacking function, the combined packed shuffled decrypted vector to generate a combined shuffled decrypted vector; generating, with the first computing system, the similarity score based on the combined shuffled decrypted vector; and based on a determination that the similarity score exceeds a threshold value, performing, with the first computing system, one or more tasks in response to the first request.

According to some embodiments, the method might further comprise generating, with the first computing system, an encryption key pair comprising the public key and the private key.

According to some embodiments, shuffling the elements and corresponding elements of the second vector and the encrypted first vector using the permutation function might comprise randomly or pseudo-randomly shuffling the elements and corresponding elements of the second vector and the encrypted first vector using the permutation. In some cases, combining the encrypted packed shuffled second vector with the packed shuffled encrypted first vector might comprise at least one of performing an encrypted vector subtraction of the encrypted packed shuffled second vector from the packed shuffled encrypted first vector, performing an encrypted vector addition of the encrypted packed shuffled second vector to the packed shuffled encrypted first vector, dividing the packed shuffled encrypted first vector by the encrypted packed shuffled second vector, or multiplying the packed shuffled encrypted first vector by the encrypted packed shuffled second vector, and/or the like. In some instances, the first vector might comprise a plurality of elements comprising two or more elements having identical values, wherein individually encrypting each element of the first vector associated with the third entity to generate the encrypted first vector might comprise individually encrypting one of the two or more elements having identical values, duplicating the encryption for each of the other of the two or more elements, and individually encrypting each of the other elements among the plurality of elements.

In some embodiments, the first vector and the second vector might each comprise biometric data associated with the third entity, wherein the biometric data might comprise at least one of face pattern data, fingerprint pattern data, or iris pattern data, and/or the like. In some cases, the similarity score might comprise at least one of one or more decimal values, one or more integer values, or one or more ordinal values ranging between a lowest value and a highest value, where the highest value (or the lowest value) indicates that the first vector and the second vector are identical, while the lowest value (or the highest value) indicates that the first vector and the second vector are completely different, and a value between the highest value and the lowest value indicates varying levels of similarity between the first vector and the second vector. In some instances, the threshold value might comprise (a predetermined value(s) within the range or) a value that is one of the following percentages of a difference between the highest value and the lowest value: 70%, 75%, 80%, 85%, 90%, 95%, or 99%, and/or the like.

According to some embodiments, the first entity might comprise one of a financial institution, a credit card company, a debit card company, a payment service provider, a content access service provider, an authentication service provider, a manufacturer of video management software, a supplier of video management software, an enterprise user of video management software, a manufacturer of embedded device cameras, a supplier of embedded device cameras, an enterprise user of embedded device cameras, a manufacturer of automotive vehicles, a supplier of automotive vehicles, an enterprise user of automotive vehicles, a manufacturer of access control devices, a supplier of access control devices, an enterprise user of access control devices, a manufacturer of self-service kiosks, a supplier of self-service kiosks, or an enterprise user of self-service kiosks, and/or the like. In some cases, the second entity might comprise one of a retailer, a financial end-use system service provider, an automated teller machine ("ATM") service provider, a purchase payment terminal service provider, a cryptography terminal service provider, a user of video management software, a supplier of video management software, a user of embedded device cameras, a supplier of embedded device cameras, a user of automotive vehicles, a supplier of automotive vehicles, a user of access control devices, a supplier of access control devices, a user of self-service kiosks, or a supplier of self-service kiosks, and/or the like. In some cases, the self-service kiosks might include, for example, kiosks for checkout, kiosks for payment, kiosks for travel-related interactions, kiosks for managing customer rewards, kiosks for special services, or kiosks for other purposes, and/or the like. In some instances, the third entity might comprise one of a customer, a shopper, an access requester, an end-user, a user of video management software, a supplier of video management software, a user of embedded device cameras, a supplier of embedded device cameras, a user of automotive vehicles, a supplier of automotive vehicles, a user of access control devices, a supplier of access control devices, a user of self-service kiosks, or a supplier of self-service kiosks, and/or the like. In some cases, the second entity and the third entity might be the same entity. In some embodiments, the method might further comprise dividing, with the second computing system, the second vector into the two or more elements, prior to packing the two or more elements of the second vector.

In yet another aspect, a system might comprise a first computing system associated with a first entity and a second computing system associated with a second entity. The first computing system might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the first computing system to: send an encrypted first vector and a generated public key to the second computing system associated with the second entity in response to receiving a first request from the first computing system on behalf of the second entity or a third entity.

The second computing system might comprise at least one second processor and a second non-transitory computer readable medium communicatively coupled to the at least one second processor. The second non-transitory computer readable medium might have stored thereon computer software comprising a second set of instructions that, when executed by the at least one second processor, causes the second computing system to: receive, from the first computing system, the encrypted first vector and the generated public key in response to sending the first request to the first computing system on behalf of the second entity or a third entity; pack, using a packing function, two or more elements of a second vector associated with the third entity to generate a packed second vector, the packed second vector having fewer elements than the second vector; individually encrypt, using the received generated public key, each element of the packed second vector to generate an encrypted packed second vector; pack, using the packing function, two or more elements of the encrypted first vector to generate a packed encrypted first vector, the two or more elements of the encrypted first vector corresponding to the two or more elements of the second vector; combine the encrypted packed second vector with the packed encrypted first vector to generate a combined packed encrypted vector; and send the combined packed encrypted vector to the first computing system for the first computing system to generate a similarity score that is indicative of differences between the second vector and the first vector.

According to some embodiments, the second set of instructions, when executed by the at least one second processor, causes the second computing system to: prior to packing the two or more elements of the second vector, shuffle, using a permutation function, elements of the second vector to generate a shuffled second vector. Packing the two or more elements of the second vector might comprise packing, using the packing function, two or more elements of the shuffled second vector to generate a packed shuffled second vector, the packed shuffled second vector having fewer elements than the shuffled second vector. Individually encrypting each element of the packed second vector might comprise individually encrypting, using the received generated public key, each element of the packed shuffled second vector to generate an encrypted packed shuffled second vector.

The second set of instructions, when executed by the at least one second processor, causes the second computing system to: prior to packing the two or more elements of the encrypted first vector, shuffling, using the permutation function, corresponding elements of the encrypted first vector to generate a shuffled encrypted first vector. Packing the two or more elements of the encrypted first vector might comprise packing, using the packing function, two or more elements of the shuffled encrypted first vector to generate a packed shuffled encrypted first vector, the two or more elements of the shuffled encrypted first vector corresponding to the two or more elements of the shuffled second vector. Combining the encrypted packed second vector with the packed encrypted first vector might comprise combining the encrypted packed shuffled second vector with the packed shuffled encrypted first vector to generate a combined packed shuffled encrypted vector. Sending the combined packed encrypted vector to the first computing system might comprise sending the combined packed shuffled encrypted vector to the first computing system for the first computing system to generate the similarity score that is indicative of differences between the second vector and the first vector.

According to some embodiments, combining the encrypted packed shuffled second vector with the packed shuffled encrypted first vector might comprise at least one of performing an encrypted vector subtraction of the encrypted packed shuffled second vector from the packed shuffled encrypted first vector, performing an encrypted vector addition of the encrypted packed shuffled second vector to the packed shuffled encrypted first vector, dividing the shuffled encrypted first vector by the encrypted packed shuffled second vector, or multiplying the packed shuffled encrypted first vector by the encrypted packed shuffled second vector, and/or the like.

In some embodiments, the first vector might comprise a plurality of elements comprising two or more elements having identical values, wherein individually encrypting each element of the first vector associated with the third entity to generate the encrypted first vector might comprise individually encrypting one of the two or more elements having identical values, duplicating the encryption for each of the other of the two or more elements, and individually encrypting each of the other elements among the plurality of elements.

In some embodiments, the first vector and the second vector might each comprise biometric data associated with the third entity, wherein the biometric data might comprise at least one of face pattern data, fingerprint pattern data, or iris pattern data, and/or the like.

In some embodiments, the first entity might comprise one of a financial institution, a credit card company, a debit card company, a payment service provider, a content access service provider, an authentication service provider, a manufacturer of video management software, a supplier of video management software, an enterprise user of video management software, a manufacturer of embedded device cameras, a supplier of embedded device cameras, an enterprise user of embedded device cameras, a manufacturer of automotive vehicles, a supplier of automotive vehicles, an enterprise user of automotive vehicles, a manufacturer of access control devices, a supplier of access control devices, an enterprise user of access control devices, a manufacturer of self-service kiosks, a supplier of self-service kiosks, or an enterprise user of self-service kiosks, and/or the like. The second entity might comprise one of a retailer, a financial end-use system service provider, an automated teller machine ("ATM") service provider, a purchase payment terminal service provider, a cryptography terminal service provider, a user of video management software, a supplier of video management software, a user of embedded device cameras, a supplier of embedded device cameras, a user of automotive vehicles, a supplier of automotive vehicles, a user of access control devices, a supplier of access control devices, a user of self-service kiosks, or a supplier of self-service kiosks, and/or the like. In some cases, the self-service kiosks might include, for example, kiosks for checkout, kiosks for payment, kiosks for travel-related interactions, kiosks for managing customer rewards, kiosks for special services, or kiosks for other purposes, and/or the like. The third entity might comprise one of a customer, a shopper, an access requester, an end-user, a user of video management software, a supplier of video management software, a user of embedded device cameras, a supplier of embedded device cameras, a user of automotive vehicles, a supplier of automotive vehicles, a user of access control devices, a supplier of access control devices, a user of self-service kiosks, or a supplier of self-service kiosks, and/or the like.

In still another aspect, a method might comprise receiving, with a first computing system associated with a first entity and from a second computing system associated with a second entity, a first request on behalf of the second entity or a third entity. The method might also comprise individually encrypting, with the first computing system and using a generated public key and an encryption function, a first vector associated with the third entity to generate an encrypted first vector, by: individually encrypting, with the first computing system and using the generated public key and the encryption function, one of two or more elements of the first vector having identical values; duplicating, with the first computing system, the encryption for each of the other of the two or more elements; and individually encrypting, with the first computing system and using the generated public key and the encryption function, each of the other elements of the first vector. The method might further comprise sending, with the first computing system, the encrypted first vector and the generated public key to the second computing system for the second computing system to generate a combined packed shuffled encrypted vector that can be used by the first computing system to generate a similarity score that is indicative of differences between the first vector and a second vector associated with the third entity.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing signal encryption or signal authentication, and, more particularly, to methods, systems, and apparatuses for implementing signal encryption or signal authentication that enables measuring a distance or a similarity value between two fixed-length signals without disclosing the contents of the signals, particularly as the signals pertain to biometric signals or signals containing biometric data, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing signal encryption or signal authentication that enables measuring a distance or a similarity value between two fixed-length signals without disclosing the contents of the signals, in accordance with various embodiments.

In the non-limiting embodiment of FIG. 1, system 100 might comprise a first computing system 105 and corresponding database(s) 110, both associated with first entity 115. System 100 might further comprise a second computing system 120 and corresponding database(s) 125, both associated with second entity 130. In some instances, the database(s) 125 might include, but is not limited to, a hard drive, an internal data storage device, an external data storage device, and/or the like, that may be used to store customer records associated with customers of the second entity 130, to store a previously agreed to encryption function, to store a public key, or the like. The first computing system 105 might communicatively couple with the second computing system 120 via network(s) 135, or the like.

In some cases, the network(s) 135 might each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network(s) 135 might include an access network of the service provider (e.g., an Internet service provider ("ISP")). In another embodiment, the network(s) 135 might include a core network of the service provider, and/or the Internet.

In some embodiments, system 100 might comprise a user device 140 (optional) that is useable by, or associated with, user 145, both the user device 140 and the user 145 being associated with a third entity 150 (assuming user 145 is different from the third entity 150). User 145 (either directly or indirectly via user device 140) might communicate with second computing system 120 (as depicted by the double-headed arrows in FIG. 1, or the like). According to some embodiments, the first entity 115 might include, without limitation, one of a financial institution, a credit card company, a debit card company, a payment service provider, a content access service provider, an authentication service provider, a manufacturer of video management software, a supplier of video management software, an enterprise user of video management software, a manufacturer of embedded device cameras, a supplier of embedded device cameras, an enterprise user of embedded device cameras, a manufacturer of automotive vehicles, a supplier of automotive vehicles, an enterprise user of automotive vehicles, a manufacturer of access control devices, a supplier of access control devices, an enterprise user of access control devices, a manufacturer of self-service kiosks, a supplier of self-service kiosks, or an enterprise user of self-service kiosks, and/or the like. For example, the enterprise user of automotive vehicles might be an enterprise customer that owns a full fleet of vehicles and permits only registered and authenticated drivers. In some embodiments, the techniques described herein and with respect to the figures may be packaged into a software as a service ("SaaS") implementation that is tailored for each of the industries and use cases associated with the first entity 115 (e.g., financial sector, credit or debit card industry, payment industry, content access service industry, video management software industry, embedded device camera industry, automotive vehicle industry, access control device industry, self-service kiosk industry, etc.).

In some cases, the second entity 130 might include, but is not limited to, one of a retailer, a financial end-use system service provider, an automated teller machine ("ATM") service provider, a purchase payment terminal service provider, a cryptography terminal service provider, a user of video management software, a supplier of video management software, a user of embedded device cameras, a supplier of embedded device cameras, a user of automotive vehicles, a supplier of automotive vehicles, a user of access control devices, a supplier of access control devices, a user of self-service kiosks, or a supplier of self-service kiosks, and/or the like. In some cases, the self-service kiosks might include, for example, kiosks for checkout, kiosks for payment, kiosks for travel-related interactions, kiosks for managing customer rewards, kiosks for special services, or kiosks for other purposes, and/or the like. The third entity 150 might include, without limitation, one of a customer, a shopper, an access requester, an end-user, a user of video management software, a supplier of video management software, a user of embedded device cameras, a supplier of embedded device cameras, a user of automotive vehicles, a supplier of automotive vehicles, a user of access control devices, a supplier of access control devices, a user of self-service kiosks, or a supplier of self-service kiosks, and/or the like. In some instances, the second entity 130 and the third entity 150 might be the same entity; in such a case, the user device 140 and the user 145, together with the second computing system 120 and database(s) 125, might be associated with the same entity (i.e., second entity 130 or third entity 150). In some cases, the user device 140 might include, but is not limited to, at least one of a laptop computer, a tablet computer, a smart phone, a mobile phone, an end terminal, a payment system, an ATM, a cryptography terminal, an electronic payment system, a clearing house system, an automated clearing house ("ACH") system, a real-time gross settlement ("RTGS") system, a Pan-European ACH ("PE-ACH") system, and/or the like.

In operation, user 145 or third entity 150 might request access or authentication via second computing system 120, might request access or authentication via user device 140 communicating with the second computing system 120 (and by sending request 155), or might otherwise send a request for the first computing system 105 to perform one or more tasks, and/or the like. In some cases, the request 155 might include, without limitation, request data 155a and biometric data 155b. In some embodiments, the request data 155a might comprise information pertaining to the request for access, including, but not limited to, at least one of request for access to content, request for access to data, request for access to user profiles, request to authorize payment, request to unlock mobile devices, request to validate identities when using online services, request for access to financial information, request for access to financial assets, request for access to transfer financial assets, request for access to property assets, request for access to transfer property assets, request for access to digital assets, request for access to transfer digital assets, request for access to secure facilities, name of the user 145, password of the user 145, or answers of the user 145 to security questions, and/or the like. According to some embodiments, the biometric data 155b might include, but is not limited to, at least one of face pattern data, fingerprint pattern data, or iris pattern data, and/or the like. In response to receiving the request 155 from the user 145 or third entity 150, the second computing system 120 might request or establish secure communications with the first computing system 105 via network(s) 135. After the second computing system 120 has established secure communications with the first computing system 105 via network(s) 135, the second computing system 120 might send request 160 to the first computing system 105 via network(s) 135. In some instances, the request 160 might include the request data 155a, without including the biometric data 155b.

The first computing system 105 might receive, from the second computing system 120 (in some cases, via network(s) 135), a first request 160 on behalf of the user 145, the second entity 130, or the third entity 150. In some embodiments, the first request 160 might include, but is not limited to, a request for access or authentication on behalf of a user, the second entity, or the third entity; a request to connect with the first computing system; a request to send data (e.g., combined packed shuffled encrypted vectors, or the like); or a request to perform one or more tasks; and/or the like. In some instances, the one or more tasks might include, but is not limited to, providing the user, the second entity, or the third entity with access to at least one of content, data, user profiles, devices, accounts, services, or financial assets, and/or the like; authenticating the user, the second entity, or the third entity; allowing the second computing system to send data (e.g., combined packed shuffled encrypted vectors, or the like); and/or the like. In some cases, first computing system 105 might generate an encryption key pair comprising a public key 165b and a private key (not shown in FIG. 1). The first computing system 105 might individually encrypt, using the public key 165b and an encryption function 165c, each element of a first vector associated with the third entity 150 (or the user 145) to generate an encrypted first vector 165a. The first computing system 105 might send the encrypted first vector 165a, the public key 165b, and the encryption function 165c (optional), in response 165, to the second computing system 120, via network(s) 135.

The second computing system 120 might receive the encrypted first vector 165a, the public key 165b, and the encryption function 165c (optional). The second computing system 120 might shuffle, using a permutation function (not shown in FIG. 1), elements of a second vector associated with the third entity 150 (or the user 145) to generate a shuffled second vector; might pack, using a packing function (not shown in FIG. 1), two or more elements of the shuffled second vector to generate a packed shuffled second vector, the packed shuffled second vector having fewer elements than the shuffled second vector; might individually encrypt, using the received public key (and the received encryption function in cases where the encryption function is sent; in cases where the encryption function is not sent, an a priori agreed-to encryption function may be used), each element of the packed shuffled second vector to generate an encrypted packed shuffled second vector; might shuffle, using the permutation function, corresponding elements of the encrypted first vector to generate a shuffled encrypted first vector; might pack, using the packing function, two or more elements of the shuffled encrypted first vector to generate a packed shuffled encrypted first vector 175, the two or more elements of the shuffled encrypted first vector corresponding to the two or more elements of the shuffled second vector; might combine the encrypted packed shuffled second vector 180 with the packed shuffled encrypted first vector 175 to generate a combined packed shuffled encrypted vector 170; and might send the combined packed shuffled encrypted vector 170 to the first computing system 105, via network(s) 135. In some embodiments, the second computing system 120 might divide the second vector into the two or more elements, prior to shuffling and packing the two or more elements of the second vector.

According to some embodiments, shuffling the elements and corresponding elements of the second vector and the encrypted first vector using the permutation function might comprise randomly or pseudo-randomly shuffling the elements and corresponding elements of the second vector and the encrypted first vector using the permutation. In some instances, the first vector might comprise a plurality of elements including, but not limited to, two or more elements having identical values, and individually encrypting each element of the first vector associated with the user 145 or the third entity 150 to generate the encrypted first vector 165a might comprise individually encrypting one of the two or more elements having identical values, duplicating the encryption for each of the other of the two or more elements, and individually encrypting each of the other elements among the plurality of elements.

In some embodiments, combining the encrypted packed shuffled second vector 180 with the packed shuffled encrypted first vector 175 (or vice versa) might comprise at least one of performing an encrypted vector subtraction of the encrypted packed shuffled second vector 180 from the packed shuffled encrypted first vector 175, performing an encrypted vector addition of the encrypted packed shuffled second vector 180 to the packed shuffled encrypted first vector 175, dividing the packed shuffled encrypted first vector 175 by the encrypted packed shuffled second vector 180, or multiplying the packed shuffled encrypted first vector 175 by the encrypted packed shuffled second vector 180, and/or the like.

The first computing system 105 might receive the combined packed shuffled encrypted vector 170; might individually decrypt, using the private key (not shown in FIG. 1) and a decryption function (not shown in FIG. 1), each element of the combined packed shuffled encrypted vector 170 to generate a combined packed shuffled decrypted vector (not shown in FIG. 1); might unpack, using an unpacking function (not shown in FIG. 1) corresponding to the packing function, the combined packed shuffled decrypted vector (not shown in FIG. 1) to generate a combined shuffled decrypted vector (not shown in FIG. 1); and might generate a similarity score 185 based on the combined shuffled decrypted vector, the similarity score being indicative of differences between the second vector and the first vector. In some embodiments, based on a determination that the similarity score 185 exceeds a threshold value, the first computing system 105 might perform one or more tasks in response to the first request. According to some embodiments, the one or more tasks might include, but is not limited to, providing the user, the second entity, or the third entity with access to at least one of content, data, user profiles, devices, accounts, services, or financial assets, and/or the like; authenticating the user, the second entity, or the third entity; allowing the second computing system to send data (e.g., combined packed shuffled encrypted vectors, or the like); and/or the like. Based on a determination that the similarity score 185 does not exceed the threshold value, the first computing system 105 might deny the first request. In some cases, the first computing system 105 might optionally send the similarity score 185 to the second computing system 120, via network(s) 135.

According to some embodiments, the first vector and the second vector might each comprise biometric data associated with the user 145 or the third entity 150, wherein the biometric data might include, without limitation, at least one of face pattern data, fingerprint pattern data, or iris pattern data, and/or the like. In some embodiments, the similarity score 185 might include, but is not limited to, at least one of one or more decimal values, one or more integer values, or one or more ordinal values ranging between a lowest value and a highest value, where the highest value (or the lowest value) indicates that the first vector and the second vector are identical, while the lowest value (or the highest value) indicates that the first vector and the second vector are completely different, and a value between the highest value and the lowest value indicates varying levels of similarity between the first vector and the second vector. Alternatively, the similarity score might be any positive or negative scalar multiple or other transformation(s), or the like. In some cases, the threshold value might comprise a predetermined value(s) within the range or a value that is one of the following percentages of a difference between the highest value and the lowest value: 70%, 75%, 80%, 85%, 90%, 95%, or 99%, and/or the like.

For instance, the similarity score 185 might be a decimal value ranging between 0 and 1, where a value of 1 might indicate that the first vector and the second vector are identical, while a value of 0 might indicate that the first vector and the second vector are completely different, and a value between 0 and 1 might indicate varying levels of similarity between the first vector and the second vector. In such instances, the threshold value might include, but is not limited to, one of 0.7, 0.75, 0.8, 0.85, 0.9, 0.95, or 0.99, and/or the like. Alternatively, the similarity score 185 might be an integer value ranging between 0 and 100, where a value of 100 might indicate that the first vector and the second vector are identical, while a value of 0 might indicate that the first vector and the second vector are completely different, and a value between 0 and 100 might indicate varying levels of similarity between the first vector and the second vector. In such cases, the threshold value might include, but is not limited to, one of 70, 75, 80, 85, 90, 95, or 99, and/or the like. In yet another alternative embodiment, the similarity score 185 might be an integer value ranging between −100 and 100, where a value of 100 might indicate that the first vector and the second vector are identical, while a value of −100 might indicate that the first vector and the second vector are completely different, and a value between −100 and 100 might indicate varying levels of similarity between the first vector and the second vector. In such instances, the threshold value might include, but is not limited to, one of 50, 55, 60, 65, 70, 75, 80, 85, 90, 95, 98, or 99, and/or the like. These are merely some non-limiting example implementations of the similarity score. The various embodiments are not limited to such implementations, and may be embodied by any suitable range of values indicative of identicalness at one end of the range, complete difference at the other end of the range, and varying degrees of similarity in between.

In some aspects, the various embodiments provide a method for secure distance metric comparison that expands upon the "Permutation Protocol" in a manner that allows the technique to be performed with significantly fewer computations, and hence can be performed in high-throughput environments or on low-cost hardware.

In the Permutation Protocol, two parties (referred to as "Alice" and "Bob" in the following example) have multi-dimensional positive integer vectors of fixed and equal length n, which span the metric space S. The protocol is said to be "privacy preserving" as neither party discovers the other's vector.

The first concept in this protocol is the notion of a permutation that is described as follows. If Alice has vector X that is an element of the set S (i.e., X∈S) and Bob has vector Y that is an element of the set S (i.e., Y∈S), the Permutation Protocol allows Alice to obtain π(X+Y)∈S, where π(X+Y)=π(X)+π(Y), and π(•)→S is a reordering or "permutation" of the elements of the vector.

The second concept in the protocol is the notion of an "additive homomorphic cryptosystem." The cryptosystem defines an encryption function E(•) and decryption function D(•) that operate on non-negative integers, where D(E(x))=x. We use the word "plaintext" to refer to values in the origin integer space (and the output space of D), and "ciphertext" to refer to values that have been encrypted by E. Multiplication of two ciphertexts is equivalent to the addition of their plaintext values subsequently encrypted. That is, E(a)×E(b)=E(a+b). Based on this property of an additive homomorphic cryptosystem, it follows that $E(a)^{E(b)}=E(a \times b)$.

The protocol may be used to compute a variety of privacy preserving distance metrics including $L_1$, $L_2$, and dot product. Subtraction in the encrypted space is formulated as the addition of the negated vector, where both parties agree on a constant scalar value to shift negated vectors such that all elements are positive, then the constant scalar is subtracted after decrypting. The dot product is formulated as a function of the $L_2$ distance: $2\Sigma_{i=1}^{n} X_i Y_i = \Sigma_{i=1}^{n} X_i^2 + \Sigma_{i=1}^{n} Y_i^2 - \Sigma_{i=1}^{n}(X_i - Y_i)^2$.

By extension, privacy preserving matrix projections, convolutions, k-nearest neighbors, and/or support vector machines, or the like, may also be used.

The Permutation Protocol comprises the following three steps:
1. Alice generates an encryption key pair (including a public and private key), individually encrypts each element in her vector using the public key and E(•), and transmits her public key and encrypted elements to Bob.
2. Bob individually encrypts each element in his vector using Alice's public key and E(•), and adds his vector to Alice's, thus leveraging the additive homomorphic property of the cryptosystem.
3. Bob shuffles the combined vector before returning it to Alice, and Alice decrypts the elements to obtain π(X+Y).

Here, Alice has protected her vector X from Bob using encryption, and Bob has protected his vector Y from Alice using a shuffle.

The protocol requires a total of 2n encryptions and n decryptions. Encryption is costly both in compute time and transmission bandwidth. We claim two novel optimizations that decrease the number of required encryptions and decryptions.

For a first embodiment, without loss in generality we assume that plaintext elements are positive integers less than k. Instead of performing Step 2 of the Permutation Protocol as described above, Bob starts by shuffling his plaintext vector and Alice's encrypted vector using the same permutation. Bob computes $\Sigma_{i=0}^{n}(y_i \times k^i)$ [referred to herein as "an unencrypted packing function"], where $k^i$ is k raised to the i-th power, on his plaintext vector and then encrypts the result. Bob also computes $\Pi_{i=0}^{n} = x_i^{k^i}$ [referred to herein as "an encrypted packing function"] on Alice's encrypted vector. Bob adds (i.e., multiplies in the ciphertext space)

these encrypted values to obtain $E(\Sigma_{i=0}^{n}(x_i+y_i) \times k^i)$. Bob transmits this single encrypted value to Alice who decrypts it to some "packed" value p, and can obtain each shuffled element sum $\pi(x_i+y_i)=(p \div k^i) \mod k$. A convenient choice for k is a power-of-two, as multiplications and divisions become bitshifts and modulus becomes a bitmask.

In practice, this technique may be limited to sub-vectors of length l<n, either because the packed integers grow too large to fit in the cipherspace or because shifting Alice's vector in the cipherspace no longer results in a speedup. Thus, the key benefit of this improved method is that it reduces the number of encryptions in Step 2 from n to n/l, and the number of decryptions in Step 3 from n to n/l. Hence, the total number of encryptions and decryptions for this scheme is reduced from 2n encryptions and n decryptions using the methods described above with respect to the Permutation Protocol, to only requiring n+n/l encryptions and n/l decryptions in the first embodiment.

For a second embodiment, if Alice has a value that is repeated across m feature vector dimensions, and she is willing to reveal to Bob which dimensions have the same value (though not what the value is), she can encrypt the value once instead of m times, for a savings of (m−1)×l encryptions in Step 1 for each repeated value. Thus, in conjunction with the first embodiment, only n−(m−1)×l+n/l encryptions and n/l decryptions are required.

In accordance with the various embodiments described herein, the signal encryption or signal authentication techniques and systems herein allow for more secure signal encryption or signal authentication by performing comparisons (and thus authentication) while in the encrypted space without risking sensitive data being in left in the unencrypted or decrypted space, by shuffling sub-vectors of "plaintext" vectors or decrypted/unencrypted vectors (rather than "ciphertext" vectors or encrypted vectors) to prevent reverse engineering or figuring out vectors, and/or by streamlining repeated or duplicate sub-vectors or feature vector dimensions by encrypting only one of the repeated or duplicate sub-vectors or feature vector dimensions, or the like.

These and other functions of the system 100 (and its components) are described in greater detail below with respect to FIGS. 2-4.

Figure 2:
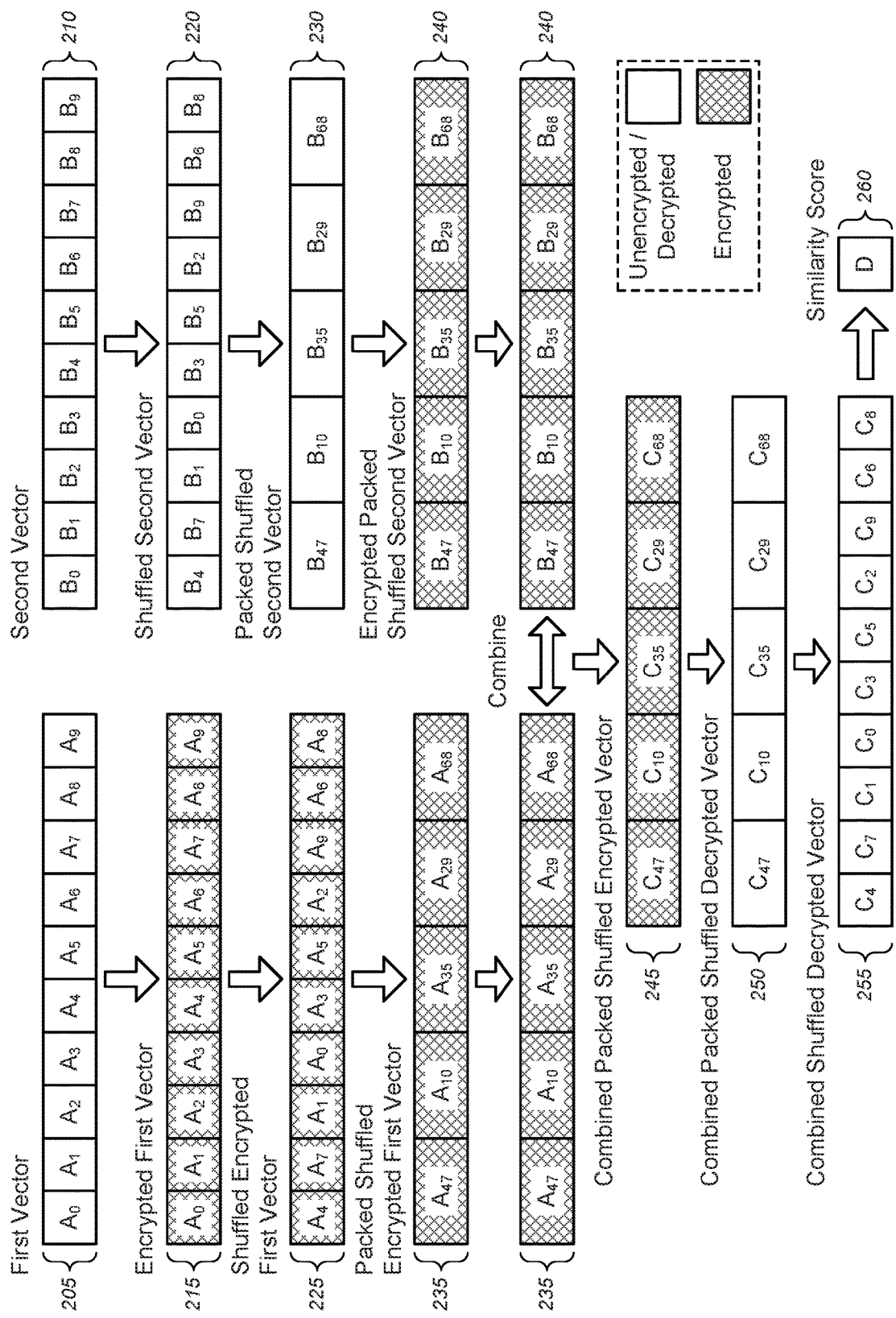
FIG. 2 is a schematic diagram illustrating a non-limiting example of signal encryption or signal authentication that enables measuring a distance or a similarity value between two fixed-length signals without disclosing the contents of the signals, in accordance with various embodiments.

FIG. 2 is a schematic diagram illustrating a non-limiting example 200 of signal encryption or signal authentication that enables measuring a distance or a similarity value between two fixed-length signals without disclosing the contents of the signals, in accordance with various embodiments. In the non-limiting example 200 of FIG. 2, the first vector 205 and the second vector 210 might each comprise 10 elements (or sub-vectors) $A_0$-$A_9$ and $B_0$-$B_9$, respectively, each element (or other sub-vector) having equal length as the other elements. Although 10 elements are shown for each of vectors 205 and 210, the various embodiments are not so limited, and each of vectors 205 and 210 might comprise any suitable number of elements having equal lengths. In FIG. 2, unencrypted or decrypted elements of each vector 205 or 210 might be depicted by solid colored blocks, while encrypted elements of each vector 205 or 210 might be depicted by cross-hatched blocks.

A first computing system associated with a first entity (not unlike first computing system 105 associated with first entity 115 of FIG. 1, or the like) might receive, from a second computing system associated with a second entity (not unlike second computing system 120 associated with second entity 130 of FIG. 1, or the like) (in some cases, via a network(s), such as network(s) 135 of FIG. 1, or the like), a first request (e.g., request 160 of FIG. 1, or the like) on behalf of a user or third entity (similar to user 145 or third entity 150 of FIG. 1, or the like). In some embodiments, the first request might include, but is not limited to, a request for access or authentication on behalf of a user, the second entity, or the third entity; a request to connect with the first computing system; a request to send data (e.g., combined packed shuffled encrypted vectors, or the like); or a request to perform one or more tasks; and/or the like. In some instances, the one or more tasks might include, but is not limited to, providing the user, the second entity, or the third entity with access to at least one of content, data, user profiles, devices, accounts, services, or financial assets, and/or the like; authenticating the user, the second entity, or the third entity; allowing the second computing system to send data (e.g., combined packed shuffled encrypted vectors, or the like); and/or the like. In some cases, the first computing system might generate an encryption key pair comprising a public key and a private key (not shown in FIG. 1 or 2).

The first computing system might individually encrypt, using the public key (similar to public key 165b of FIG. 1, or the like) and an encryption function (similar to encryption function 165c of FIG. 1, or the like), each element of the first vector 205 associated with the user or the third entity to generate an encrypted first vector 215 (similar to encrypted first vector 165a of FIG. 1, or the like). The first computing system might send the encrypted first vector 215, the public key, and the encryption function (optional) (e.g., in response 165 of FIG. 1, or the like), to the second computing system, via the network(s).

The second computing system might receive the encrypted first vector 215, the public key, and the encryption function (optional). The second computing system might shuffle, using a permutation function, elements of a second 210 vector associated with the user or the third entity to generate a shuffled second vector 220 (depicted in the non-limiting example 200 of FIG. 2 by the second vector 210 being shuffled and reordered as $B_4$, $B_7$, $B_1$, $B_0$, $B_3$, $B_5$, $B_2$, $B_9$, $B_6$, and $B_8$, or the like); might pack, using a packing function (not shown in FIG. 2), two or more elements of the shuffled second vector 220 to generate a packed shuffled second vector 230, the packed shuffled second vector having fewer elements than the shuffled second vector (depicted in the non-limiting example 200 of FIG. 2 by elements of the shuffled second vector 210 (i.e., $B_4$, $B_7$, $B_1$, $B_0$, $B_3$, $B_5$, $B_2$, $B_9$, $B_6$, and $B_8$) being packed into two or more packed elements, in this case, $B_{47}$, $B_{10}$, $B_{35}$, $B_{29}$, and $B_{68}$, or the like), the packed shuffled second vector 230 having fewer elements than the shuffled second vector 220 (in this case, 5 elements versus 10 elements); might individually encrypt, using the received public key (and the received encryption function in cases where the encryption function is sent; in cases where the encryption function is not sent, an a priori agreed-to encryption function may be used), each element of the packed shuffled second vector 230 to generate an encrypted packed shuffled second vector 240; might shuffle, using the permutation function, corresponding elements of the encrypted first vector 215 to generate a shuffled encrypted first vector 225 (similar to shuffled encrypted first vector 175 of FIG. 1, or the like), depicted in the non-limiting example 200 of FIG. 2 by the encrypted first vector 215 being shuffled and reordered as $A_4$, $A_7$, $A_1$, $A_0$, $A_3$, $A_5$, $A_2$, $A_9$, $A_6$, and $A_8$, or the like; might pack, using the packing function, two or more elements of the shuffled encrypted first vector 225 to generate a packed shuffled encrypted first vector 235, the two or more elements of the shuffled encrypted first vector 225 corresponding to the two or more elements of the shuffled second vector 220; might combine the encrypted packed shuffled second vector 240 (similar to encrypted packed shuffled second vector 180 of FIG. 1, or the like) with the packed shuffled encrypted first vector 235 (similar to packed shuffled encrypted first vector 175 of FIG. 1, or the like) to generate a combined packed shuffled encrypted vector 245 (similar to combined packed shuffled encrypted vector 170 of FIG. 1, or the like; depicted in the non-limiting example 200 of FIG. 2 by $C_{47}$, $C_{10}$, $C_{35}$, $C_{29}$, and $C_{68}$, or the like), as depicted by the double-headed arrow; and might send the combined packed shuffled encrypted vector 245 to the first computing system, via network(s).

According to some embodiments, shuffling the elements and corresponding elements of the second vector 210 and the encrypted first vector 215 using the permutation function might comprise randomly or pseudo-randomly shuffling the elements and corresponding elements of the second vector 210 and the encrypted first vector 215 using the permutation.

In some embodiments, combining the encrypted packed shuffled second vector 240 with the packed shuffled encrypted first vector 235 (or vice versa) might comprise at least one of performing an encrypted vector subtraction of the encrypted packed shuffled second vector 240 from the packed shuffled encrypted first vector 235, performing an encrypted vector addition of the encrypted packed shuffled second vector 240 to the packed shuffled encrypted first vector 235, dividing the packed shuffled encrypted first vector 235 by the encrypted packed shuffled second vector 240, or multiplying the packed shuffled encrypted first vector 235 by the encrypted packed shuffled second vector 240, and/or the like.

The first computing system might receive the combined packed shuffled encrypted vector 245; might individually decrypt, using the private key (not shown in FIG. 2) and a decryption function (not shown in FIG. 2), each element of the combined packed shuffled encrypted vector 245 to generate a combined packed shuffled decrypted vector 250; might unpack, using an unpacking function (not shown in FIG. 2) corresponding to the packing function, the combined packed shuffled decrypted vector 250 to generate a combined shuffled decrypted vector 255; and might generate a similarity score 260 (depicted in the non-limiting example 200 of FIG. 2 by D, or the like) (similar to similarity score 185 of FIG. 1, or the like) based on the combined shuffled decrypted vector 255, the similarity score 260 being indicative of differences between the second vector 210 and the first vector 205. In some embodiments, based on a determination that the similarity score 260 exceeds a threshold value, the first computing system might perform one or more tasks in response to the first request. According to some embodiments, the one or more tasks might include, but is not limited to, providing the user, the second entity, or the third entity with access to at least one of content, data, user profiles, devices, accounts, services, or financial assets, and/or the like; authenticating the user, the second entity, or the third entity; allowing the second computing system to send data (e.g., combined packed shuffled encrypted vectors, or the like); and/or the like. Based on a determination that the similarity score 260 does not exceed the threshold value, might deny the first request. In some cases, the first computing system might optionally send the similarity score 260 to the second computing system, via network(s).

According to some embodiments, the first vector and the second vector might each comprise biometric data associated with the user or the third entity, wherein the biometric data might include, without limitation, at least one of face pattern data, fingerprint pattern data, or iris pattern data, and/or the like. In some embodiments, the similarity score 260 might include, but is not limited to, at least one of one or more decimal values, one or more integer values, or one or more ordinal values ranging between a lowest value and a highest value, where the highest value (or the lowest value) indicates that the first vector 205 and the second vector 210 are identical, while the lowest value (or the highest value) indicates that the first vector 205 and the second vector 210 are completely different, and a value between the highest value and the lowest value indicates varying levels of similarity between the first vector 205 and the second vector 210. Alternatively, the similarity score 260 might be any positive or negative scalar multiple or other transformation(s), or the like. In some cases, the threshold value might comprise a value that is one of the following percentages of a difference between the highest value and the lowest value: 70%, 75%, 80%, 85%, 90%, 95%, or 99%, and/or the like.

For instance, the similarity score 260 might be a decimal value ranging between 0 and 1, where a value of 1 might indicate that the first vector 205 and the second vector 210 are identical, while a value of 0 might indicate that the first vector 205 and the second vector 210 are completely different, and a value between 0 and 1 might indicate varying levels of similarity between the first vector 205 and the second vector 210. In such instances, the threshold value might include, but is not limited to, one of 0.7, 0.75, 0.8, 0.85, 0.9, 0.95, or 0.99, and/or the like. Alternatively, the similarity score 260 might be an integer value ranging between 0 and 100, where a value of 100 might indicate that the first vector 205 and the second vector 210 are identical, while a value of 0 might indicate that the first vector 205 and the second vector 210 are completely different, and a value between 0 and 100 might indicate varying levels of similarity between the first vector 205 and the second vector 210. In such cases, the threshold value might include, but is not limited to, one of 70, 75, 80, 85, 90, 95, or 99, and/or the like. In yet another alternative embodiment, the similarity score 260 might be an integer value ranging between −100 and 100, where a value of 100 might indicate that the first vector 205 and the second vector 210 are identical, while a value of −100 might indicate that the first vector 205 and the second vector 210 are completely different, and a value between −100 and 100 might indicate varying levels of similarity between the first vector 205 and the second vector 210. In such instances, the threshold value might include, but is not limited to, one of 50, 55, 60, 65, 70, 75, 80, 85, 90, 95, 98, or 99, and/or the like. These are merely some non-limiting example implementations of the similarity score. The various embodiments are not limited to such implementations, and may be embodied by any suitable range of values indicative of identicalness at one end of the range, complete difference at the other end of the range, and varying degrees of similarity in between.

In practice, the technique in this embodiment may be limited to sub-vectors of length $l<n$, where n is the length of each vector 205 and 210, either because the packed integers grow too large to fit in the cipherspace (or encrypted space) or because shifting the first vector 205 in the cipherspace no longer results in a speedup. Thus, the key benefit of this improved method is that it reduces the number of encryptions from n to n/l when encrypting the shuffled second vector 220 to generate the encrypted (packed) shuffled second vector 240 (by first packing the shuffled second vector 220 into packed shuffled second vector 230) and/or when combining the packed shuffled encrypted first vector 235 with the encrypted packed shuffled second vector 240, and the number of decryptions from n to n/l when or if the first computing system decrypts a combined vector 245 (which incorporates the packed shuffled encrypted first vector 235 and the encrypted packed shuffled second vector 240). Hence, the total number of encryptions and decryptions for this scheme is reduced from 2n encryptions and n decryptions using the methods described above with respect to the Permutation Protocol, to only requiring n+n/l encryptions and n/l decryptions in this technique. In this case, assuming n equals, say, 10 (as shown in FIG. 2), and length l might equal 2 (as shown in FIG. 2), so that n/l equals 5, for a reduction of 10 to 5 (or 2 times reduction) in each of the encryption and decryption steps described above.

In another non-limiting example, assuming vectors comprising base-10 values 0-9, a vector containing elements or values 2, 7, 5, and 4 (for instance) might be packed into elements or values 27 and 54 (or 275 and 4, or 2 and 754, or the like), in accordance with a predetermined packing function (or the like). Because it is computationally expensive to encrypt values or numbers, by packing the individual values or numbers into packed values, as indicated above, the number of encryption processes are reduced. In this example, n equals 4, while l equals 2, resulting in an n/l reduction of 2 encryption processes or steps. Although this example is directed to base-10 values, the various embodiments are not so limited, and may be implemented using base-N values, where N is any suitable number, including, but not limited to 2, 16, 32, 64, 128, 256, etc. In practice, there is a limit in terms of how large an unencrypted packed value can be—where such value is one of $2^{64}$, $2^{128}$, $2^{256}$, $2^{512}$, or the like. Security of the encryption scheme is a function of the size of the cipherspace, which places an upper limit on the largest value that can be encrypted. The size of the unencrypted packed value must be smaller than the size of the cipherspace, but in practice are much smaller than that. As the unencrypted packed value becomes larger, even though it fits comfortably in cipherspace, it is no longer faster to encrypt a large value (compared to encrypting multiple smaller values). Thus, in effect, the larger the unencrypted packed value, the more secure the encryption scheme, but the slower the encryption process, to the point that encrypting multiple smaller packed values becomes faster and more efficient than encrypting the large packed value.

Further, when considering the packed values are to be combined, one must consider potential overflow into the next digit category. Take for instance, encryption and combination (or comparison) of vector 1 having elements or values (9, 9) with vector 2 having elements or values (8, 5), where vectors 1 and 2 are base-10 vectors. Packing of these vectors results in 99 and 85, respectively. Combining these packed vectors in cipherspace would result in an encrypted packed value 184. The packing function or convention would expect a base-10 number from 0 to 9 in the tens digit and a base-10 number from 0 to 9 in the ones digit. The resultant 3-digit number would confound the packing function or convention (or the computing system implementing the packing function or convention). In any event, the packing function or convention would not consider the correct combination of 17 in the tens digit and 14 in the ones digit. As a result, to prevent overflow into the next digit category, the packing function or convention might limit values for packing to values 0-4 in base-10. In such a case, packing vectors having maximum allowable values (4, 4) would result in packed vectors having values 44 and 44, and combining these vectors would result in a combined value of 88, which decomposes into a combined vector of (8, 8). Similar limits are applied to other base-N values (e.g., 0-7 in base-16, and so on).

In some embodiments, a vector might include Y elements (e.g., $X_0$, $X_1$, $X_2$, $X_3$, . . . , $X_Y$), wherein Y is a positive integer and each of $X_0$ to $X_Y$ are positive integers with base-N values, wherein N is a positive integer. A packing function might divide the vector into multiple sub-vectors, each comprising Z elements or fewer, wherein Z is a positive integer less than or equal to Y; might optionally shuffle, using a permutation function, the multiple sub-vectors of the vector to generate a shuffled vector; might pack Z elements of the vector (or the shuffled vector) into a single packed element W equal to $X_0+X_1*N+X_2*N^2+X_3*N^3+ \ldots X_Z*N^Z$, wherein Z is a positive integer less than or equal to Y; might generate a packed vector for each of V number of packed elements ($W_0$, $W_1$, $W_2$, $W_3$, . . . , $W_V$); and might encrypt the packed vector using an encryption function to generate an encrypted packed vector. Such a packing function may be applied to a first vector as described above. After combining the packed and encrypted first and second vectors, as described above, an unpacking function might decrypt, using a decryption function, the combined encrypted packed vector into a combined decrypted packed vector; might unpack the combined decrypted packed vector by reversing the packing function or packing convention. The packing function may be designed to reduce the time necessary to encrypt the vector, wherein Z may be selected based on practical limitations imposed by the encryption function's computational speed considerations and memory requirements, and wherein N may be selected based on the computing system's memory capacity and computational speeds.

Figure 3:
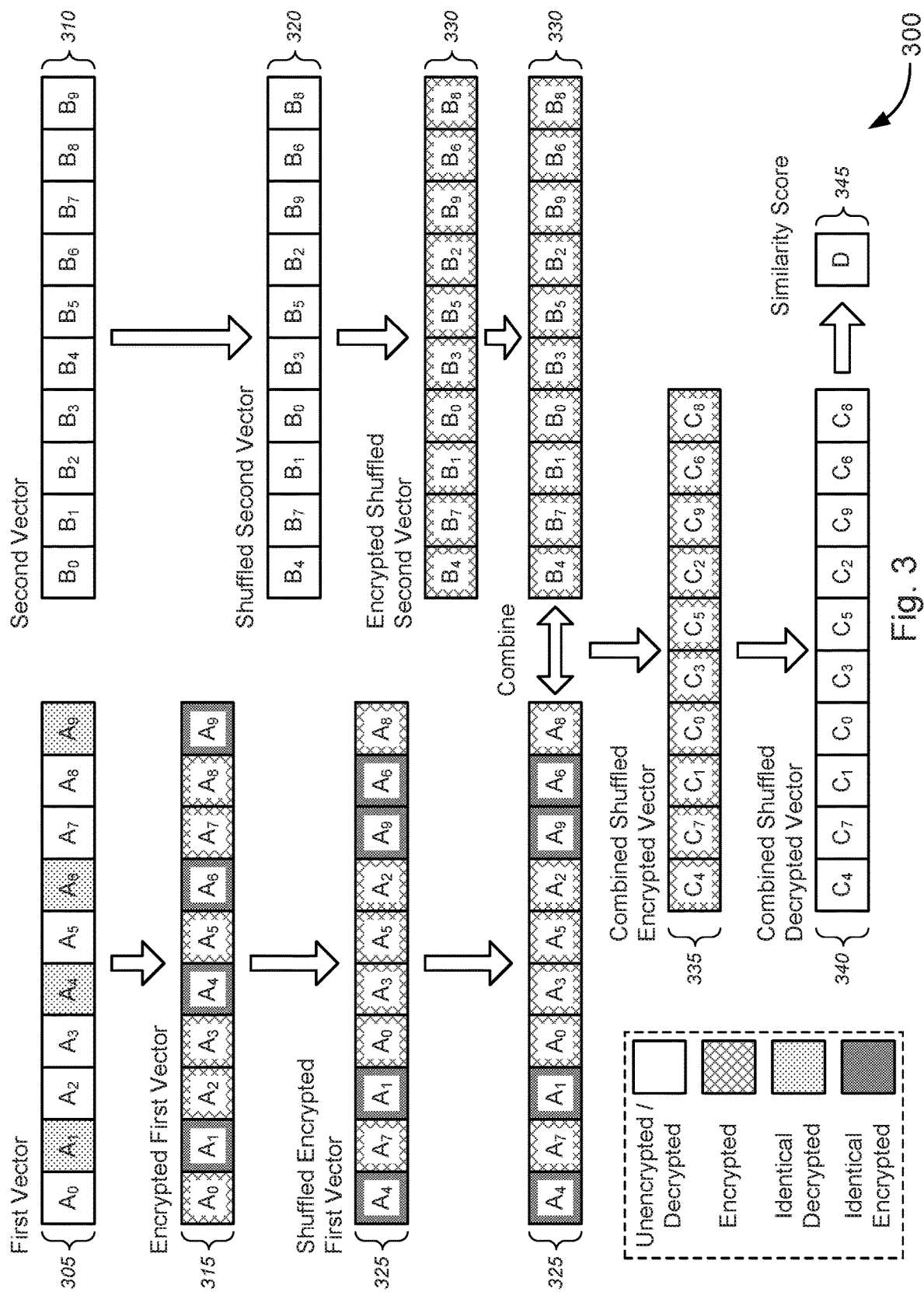
FIG. 3 is a schematic diagram illustrating another non-limiting example of signal encryption or signal authentication that enables measuring a distance or a similarity value between two fixed-length signals without disclosing the contents of the signals, in accordance with various embodiments.

FIG. 3 is a schematic diagram illustrating another non-limiting example 300 of signal encryption or signal authentication that enables measuring a distance or a similarity value between two fixed-length signals without disclosing the contents of the signals, in accordance with various embodiments. In the non-limiting example 300 of FIG. 3, the first vector 305 and the second vector 310 might each comprise 10 elements (or sub-vectors) $A_0$-$A_9$ and $B_0$-$B_9$, respectively, each element (or other sub-vector) having equal length as the other elements. Although 10 elements are shown for each of vectors 305 and 310, the various embodiments are not so limited, and each of vectors 305 and 310 might comprise any suitable number of elements having equal lengths. In FIG. 3, unencrypted or decrypted elements of each vector 305 or 310 might be depicted by solid colored blocks, while encrypted elements of each vector 305 or 310 might be depicted by cross-hatched blocks, and identical unencrypted or decrypted elements of the first vector 305 might be depicted by lightly shaded blocks, while identical encrypted elements of the first vector 305 might be depicted by heavily shaded blocks.

A first computing system associated with a first entity (not unlike first computing system 105 associated with first entity 115 of FIG. 1, or the like) might receive, from a second computing system associated with a second entity (not unlike second computing system 120 associated with second entity 130 of FIG. 1, or the like) (in some cases, via a network(s), such as network(s) 135 of FIG. 1, or the like), a first request (e.g., request 160 of FIG. 1, or the like) on behalf of a user or third entity (similar to user 145 or third entity 150 of FIG. 1, or the like). In some embodiments, the first request might include, but is not limited to, a request for access or authentication on behalf of the user or third entity, a request to connect with the first computing system, a request to send data (e.g., similarity scores, or the like), and/or the like. In some cases, the first computing system might generate an encryption key pair comprising a public key and a private key (not shown in FIG. 1).

The first computing system might individually encrypt, using the public key (similar to public key 165b of FIG. 1, or the like) and an encryption function (similar to encryption function 165c of FIG. 1, or the like), each element of the first vector 305 associated with the user or the third entity to generate an encrypted first vector 315 (similar to encrypted first vector 165a of FIG. 1, or the like). In some instances, the first vector 305 might comprise a plurality of elements including, but not limited to, two or more elements having identical values (in this case, $A_1$, $A_4$, $A_6$, and $A_9$, or the like), and individually encrypting each element of the first vector 305 associated with the user or the third entity to generate the encrypted first vector 315 might comprise individually encrypting one of the two or more elements having identical values (i.e., $A_1$, $A_4$, $A_6$, and $A_9$, or the like), duplicating the encryption for each of the other of the two or more elements (in this case, $A_1$, $A_4$, $A_6$, and $A_9$, or the like), and individually encrypting each of the other elements (in this case, $A_2$, $A_3$, $A_5$, $A_7$, $A_8$, and $A_0$, or the like) among the plurality of elements. The first computing system might send the encrypted first vector 315, the public key, and the encryption function (optional) (e.g., in response 165 of FIG. 1, or the like), to the second computing system, via the network(s).

The second computing system might receive the encrypted first vector 315, the public key, and the encryption function (optional). The second computing system might shuffle, using a permutation function, elements of a second 310 vector associated with the user or the third entity to generate a shuffled second vector 320 (depicted in the non-limiting example 300 of FIG. 3 by the second vector 310 being shuffled and reordered as $B_4$, $B_7$, $B_1$, $B_0$, $B_3$, $B_5$, $B_2$, $B_9$, $B_6$, and $B_8$, or the like); might encrypt, using the received public key (and the received encryption function in cases where the encryption function is sent; in cases where the encryption function is not sent, an a priori agreed-to encryption function may be used), the shuffled second vector 320 to generate an encrypted shuffled second vector 330; might shuffle, using the permutation function, corresponding elements of the encrypted first vector 315 to generate a shuffled encrypted first vector 325 (similar to shuffled encrypted first vector 175 of FIG. 1, or the like), depicted in the non-limiting example 300 of FIG. 3 by the encrypted first vector 315 being shuffled and reordered as $A_4$, $A_7$, $A_1$, $A_0$, $A_3$, $A_5$, $A_2$, $A_9$, $A_6$, and $A_8$, or the like; might combine the encrypted shuffled second vector 330 (similar to encrypted shuffled second vector 180 of FIG. 1, or the like) with the shuffled encrypted first vector 325 (similar to shuffled encrypted first vector 175 of FIG. 1, or the like) to generate a combined shuffled encrypted vector 335 (similar to combined shuffled encrypted vector 170 of FIG. 1, or the like; depicted in the non-limiting example 300 of FIG. 3 by $C_4$, $C_7$, $C_1$, $C_0$, $C_3$, $C_5$, $C_2$, $C_9$, $C_6$, and $C_8$, or the like), as depicted by the double-headed arrow; and might send the combined shuffled encrypted vector 335 to the first computing system, via network(s).

According to some embodiments, shuffling the elements and corresponding elements of the second vector 310 and the encrypted first vector 315 using the permutation function might comprise randomly or pseudo-randomly shuffling the elements and corresponding elements of the second vector 310 and the encrypted first vector 315 using the permutation.

In some embodiments, combining the encrypted shuffled second vector 330 with the shuffled encrypted first vector 325 (or vice versa) might comprise at least one of performing an encrypted vector subtraction of the encrypted shuffled second vector 330 from the shuffled encrypted first vector 325, performing an encrypted vector addition of the encrypted shuffled second vector 330 to the shuffled encrypted first vector 325, dividing the shuffled encrypted first vector 325 by the encrypted shuffled second vector 330, or multiplying the shuffled encrypted first vector 325 by the encrypted shuffled second vector 330, and/or the like.

The first computing system might receive the generated combined shuffled encrypted vector 335; might decrypt, using the private key and a decryption function, the generated combined shuffled encrypted vector 335 to generate combined shuffled decrypted vector 340; and might generate a similarity score 345 (depicted in the non-limiting example 300 of FIG. 3 by D, or the like) (similar to similarity score 185 of FIG. 1, or the like) based on the combined shuffled decrypted vector 340, the similarity score 345 being indicative of differences between the second vector 310 and the first vector 305. In some embodiments, based on a determination that the similarity score 345 exceeds a threshold value, the first computing system might perform one or more tasks in response to the first request. According to some embodiments, the one or more tasks might include, but is not limited to, providing the user, the second entity, or the third entity with access to at least one of content, data, user profiles, devices, accounts, services, or financial assets, and/or the like; authenticating the user, the second entity, or the third entity; allowing the second computing system to send data (e.g., combined packed shuffled encrypted vectors, or the like); and/or the like. Based on a determination that the similarity score 345 does not exceed the threshold value, might deny the first request. In some cases, the first computing system might optionally send the similarity score 345 to the second computing system, via network(s).

According to some embodiments, the first vector and the second vector might each comprise biometric data associated with the user or the third entity, wherein the biometric data might include, without limitation, at least one of face pattern data, fingerprint pattern data, or iris pattern data, and/or the like. In some embodiments, the similarity score 345 might include, but is not limited to, at least one of one or more decimal values, one or more integer values, or one or more ordinal values ranging between a lowest value and a highest value, where the highest value (or the lowest value) indicates that the first vector 305 and the second vector 310 are identical, while the lowest value (or the highest value) indicates that the first vector 305 and the second vector 310 are completely different, and a value between the highest value and the lowest value indicates varying levels of similarity between the first vector 305 and the second vector 310. Alternatively, the similarity score 345 might be any positive or negative scalar multiple or other transformation(s), or the like. In some cases, the threshold value might comprise a value that is one of the following percentages of a difference between the highest value and the lowest value: 70%, 75%, 80%, 85%, 90%, 95%, or 99%, and/or the like.

For instance, the similarity score 345 might be a decimal value ranging between 0 and 1, where a value of 1 might indicate that the first vector 305 and the second vector 310 are identical, while a value of 0 might indicate that the first vector 305 and the second vector 310 are completely different, and a value between 0 and 1 might indicate varying levels of similarity between the first vector 305 and the second vector 310. In such instances, the threshold value might include, but is not limited to, one of 0.7, 0.75, 0.8, 0.85, 0.9, 0.95, or 0.99, and/or the like. Alternatively, the similarity score 345 might be an integer value ranging between 0 and 100, where a value of 100 might indicate that the first vector 305 and the second vector 310 are identical, while a value of 0 might indicate that the first vector 305 and the second vector 310 are completely different, and a value between 0 and 100 might indicate varying levels of similarity between the first vector 305 and the second vector 310. In such cases, the threshold value might include, but is not limited to, one of 70, 75, 80, 85, 90, 95, or 99, and/or the like. In yet another alternative embodiment, the similarity score 345 might be an integer value ranging between −100 and 100, where a value of 100 might indicate that the first vector 305 and the second vector 310 are identical, while a value of −100 might indicate that the first vector 305 and the second vector 310 are completely different, and a value between −100 and 100 might indicate varying levels of similarity between the first vector 305 and the second vector 310. In such instances, the threshold value might include, but is not limited to, one of 50, 55, 60, 65, 70, 75, 80, 85, 90, 95, 98, or 99, and/or the like. These are merely some non-limiting example implementations of the similarity score. The various embodiments are not limited to such implementations, and may be embodied by any suitable range of values indicative of identicalness at one end of the range, complete difference at the other end of the range, and varying degrees of similarity in between.

With four sub-vectors $A_1$, $A_4$, $A_6$, and $A_9$ being identical or equal, the first computing system need only encrypt one of these sub-vectors once, and with each sub-vector having a length of 1, the number of encryptions would be n−(m−1)×l+n/l or 10−(4−1)×1+10/1=17 rather than n+n/l encryptions or 10+10/1=20. When the packing function of FIG. 2 and the reuse function of FIG. 3 are combined (not shown), further optimizations may be achieved.

In practice, the technique in such an embodiment may be limited to sub-vectors of length l<n, where n is the length of each vector 305 and 310, either because the packed integers grow too large to fit in the cipherspace (or encrypted space) or because shifting the first vector 305 in the cipherspace no longer results in a speedup. Thus, the key benefit of this improved method is that it reduces the number of encryptions from n to n/l when encrypting the shuffled second vector 320 to generate the encrypted shuffled second vector 330 and/or when combining the shuffled encrypted first vector 325 with the encrypted shuffled second vector 330, and the number of decryptions from n to n/l when or if the first computing system decrypts a combined vector (which incorporates the shuffled encrypted first vector 325 and the encrypted shuffled second vector 330). Hence, the total number of encryptions and decryptions for this scheme is reduced from 2n encryptions and n decryptions using the methods described above with respect to the Permutation Protocol, to only requiring n+n/l encryptions and n/l decryptions in this technique. In this case, assuming n equals, say, 10, then length l might equal 2, so that n/l equals 5, for a reduction of 10 to 5 (or 2 times reduction) in each of the encryption and decryption steps described above (as shown in FIG. 2, for example). With four packed sub-vectors being identical or equal (not shown), the first computing system need only encrypt one of these packed sub-vectors once, and with each packed sub-vector having a length of 2, the number of encryptions would be n−(m−1)×l+n/l or 10−(4−1)×2+10/2=9 rather than n+n/l encryptions or 10+10/2=15.

FIGS. 4A-4D (collectively, "FIG. 4") are flow diagrams illustrating a method 400 for implementing signal encryption or signal authentication that enables measuring a distance or a similarity value between two fixed-length signals without disclosing the contents of the signals, in accordance with various embodiments. Method 400 of FIG. 4A continues onto FIG. 4B following the circular marker denoted, "A."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, and 300 of FIGS. 1, 2, and 3, respectively (or components thereof), such methods may also be implemented using any suitable hardware (or software) implementation. Similarly, while each of the systems, examples, or embodiments 100, 200, and 300 of FIGS. 1, 2, and 3, respectively (or components thereof), can operate according to the method 400 illustrated by FIG. 4 (e.g., by executing instructions embodied on a computer readable medium), the systems, examples, or embodiments 100, 200, and 300 of FIGS. 1, 2, and 3 can each also operate according to other modes of operation and/or perform other suitable procedures.

Figure 4A:
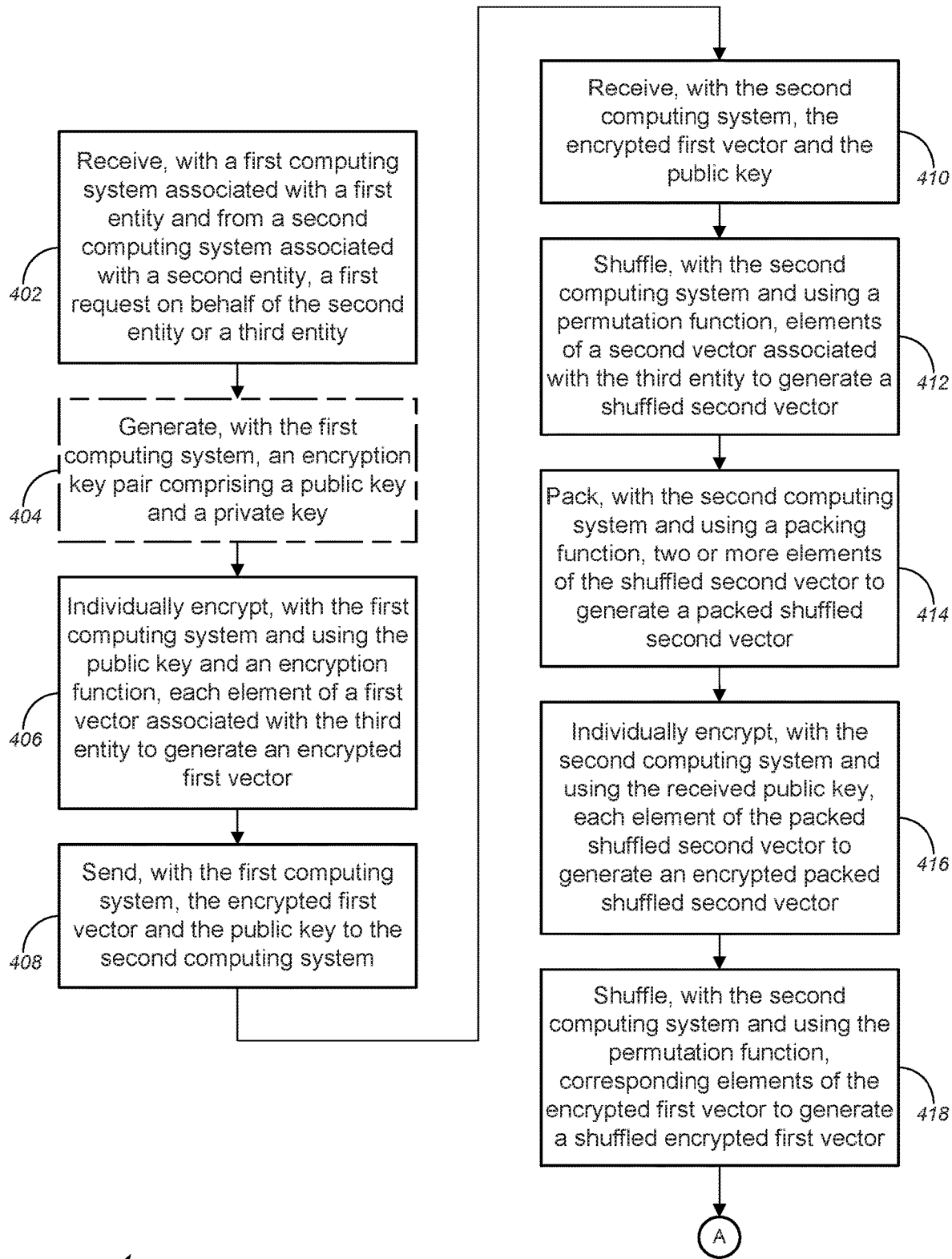
FIGS. 4A-4D are flow diagrams illustrating a method for implementing signal encryption or signal authentication that enables measuring a distance or a similarity value between two fixed-length signals without disclosing the contents of the signals, in accordance with various embodiments.

In the non-limiting embodiment of FIG. 4A, method 400, at block 402, might comprise receiving, with a first computing system associated with a first entity and from a second computing system associated with a second entity, a first request on behalf of the second entity or a third entity. According to some embodiments, the first request might include, but is not limited to, a request for access or authentication on behalf of a user, the second entity, or the third entity; a request to connect with the first computing system; a request to send data (e.g., combined packed shuffled encrypted vectors, or the like); or a request to perform one or more tasks; and/or the like. In some cases, the one or more tasks might include, but is not limited to, providing the user, the second entity, or the third entity with access to at least one of content, data, user profiles, devices, accounts, services, or financial assets, and/or the like; authenticating the user, the second entity, or the third entity; allowing the second computing system to send data (e.g., combined packed shuffled encrypted vectors, or the like); and/or the like.

In some embodiments, the first entity might include, without limitation, one of a financial institution, a credit card company, a debit card company, a payment service provider, a content access service provider, an authentication service provider, a manufacturer of video management software, a supplier of video management software, an enterprise user of video management software, a manufacturer of embedded device cameras, a supplier of embedded device cameras, an enterprise user of embedded device cameras, a manufacturer of automotive vehicles, a supplier of automotive vehicles, an enterprise user of automotive vehicles, a manufacturer of access control devices, a supplier of access control devices, an enterprise user of access control devices, a manufacturer of self-service kiosks, a supplier of self-service kiosks, or an enterprise user of self-service kiosks, and/or the like. According to some embodiments, the second entity might include, but is not limited to, one of a retailer, a financial end-use system service provider, an automated teller machine ("ATM") service provider, a purchase payment terminal service provider, a cryptography terminal service provider, a user of video management software, a supplier of video management software, a user of embedded device cameras, a supplier of embedded device cameras, a user of automotive vehicles, a supplier of automotive vehicles, a user of access control devices, a supplier of access control devices, a user of self-service kiosks, or a supplier of self-service kiosks, and/or the like. In some cases, the self-service kiosks might include, for example, kiosks for checkout, kiosks for payment, kiosks for travel-related interactions, kiosks for managing customer rewards, kiosks for special services, or kiosks for other purposes, and/or the like. The third entity might include, without limitation, one of a customer, a shopper, an access requester, an end-user, a user of video management software, a supplier of video management software, a user of embedded device cameras, a supplier of embedded device cameras, a user of automotive vehicles, a supplier of automotive vehicles, a user of access control devices, a supplier of access control devices, a user of self-service kiosks, or a supplier of self-service kiosks, and/or the like. In some cases, the second entity and the third entity might be the same entity.

At optional block 404, method 400 might comprise generating, with the first computing system, an encryption key pair comprising a public key and a private key. Method 400 might further comprise individually encrypting, with the first computing system and using the public key and an encryption function, each element of a first vector associated with the third entity to generate an encrypted first vector (block 406). Method 400 might further comprise, at block 408, sending, with the first computing system, the encrypted first vector and the public key to the second computing system.

At block 410, method 400 might comprise receiving, with the second computing system, the encrypted first vector and the public key. Method 400 might further comprise, at block 412, shuffling, with the second computing system and using a permutation function, elements of a second vector associated with the third entity to generate a shuffled second vector. According to some embodiments, the first vector and the second vector might each include, but is not limited to, biometric data associated with the third entity, wherein the biometric data might include, without limitation, at least one of face pattern data, fingerprint pattern data, or iris pattern data, and/or the like. At block 414, method 400 might comprise packing, with the second computing system and using a packing function, two or more elements of the shuffled second vector to generate a packed shuffled second vector, the packed shuffled second vector having fewer elements than the shuffled second vector. Method 400 might further comprise individually encrypting, with the second computing system and using the received public key, each element of the packed shuffled second vector to generate an encrypted packed shuffled second vector (block 416). Method 400, at block 418, might comprise shuffling, with the second computing system and using the permutation function, corresponding elements of the encrypted first vector to generate a shuffled encrypted first vector.

In some embodiments, shuffling the elements and corresponding elements of the second vector and the encrypted first vector using the permutation function might comprise randomly or pseudo-randomly shuffling the elements and corresponding elements of the second vector and the encrypted first vector using the permutation. Method 400 might continue onto the process at block 420 in FIG. 4B following the circular marker denoted, "A."

Figure 4B:
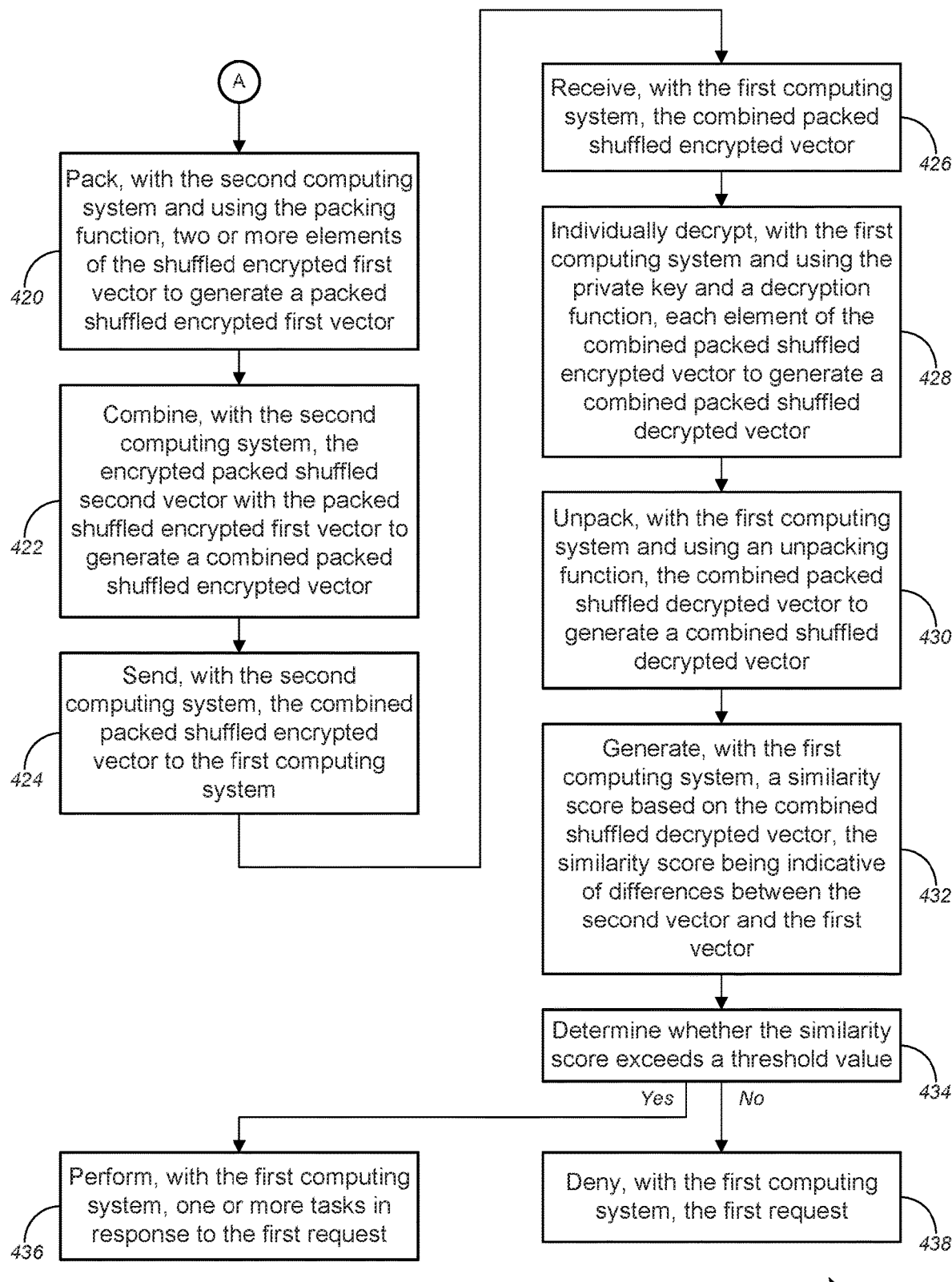

At block 420 in FIG. 4B (following the circular marker denoted, "A"), method 400 might comprise packing, with the second computing system and using the packing function, two or more elements of the shuffled encrypted first vector to generate a packed shuffled encrypted first vector, the two or more elements of the shuffled encrypted first vector corresponding to the two or more elements of the shuffled second vector. Method 400 might further comprise combining, with the second computing system, the encrypted packed shuffled second vector with the packed shuffled encrypted first vector to generate a combined packed shuffled encrypted vector (block 422). Method 400 might further comprise, at block 424, sending, with the second computing system, the combined packed shuffled encrypted vector to the first computing system.

Method 400, at block 426, might comprise, receiving, with the first computing system, the combined packed shuffled encrypted vector. At block 428, method 400 might comprise individually decrypting, with the first computing system and using the private key and a decryption function, each element of the combined packed shuffled encrypted vector to generate a combined packed shuffled decrypted vector. In some embodiments, method 400 might further comprise unpacking, with the first computing system and using an unpacking function corresponding to the packing function, the combined packed shuffled decrypted vector to generate a combined shuffled decrypted vector (block 430). Method 400, at block 432, might comprise generating, with the first computing system, a similarity score based on the combined shuffled decrypted vector, the similarity score being indicative of differences between the second vector and the first vector. Method 400 might further comprise determining whether the similarity score exceeds a threshold value (block 434). If so, method 400 might further comprise performing, with the first computing system, one or more tasks in response to the first request (block 436). According to some embodiments, the one or more tasks might include, but is not limited to, providing the user, the second entity, or the third entity with access to at least one of content, data, user profiles, devices, accounts, services, or financial assets, and/or the like; authenticating the user, the second entity, or the third entity; allowing the second computing system to send data (e.g., combined packed shuffled encrypted vectors, or the like); and/or the like. If not, method 400 might further comprise denying, with the first computing system, the first request (block 438).

According to some embodiments, the similarity score might include, but is not limited to, at least one of one or more decimal values, one or more integer values, or one or more ordinal values ranging between a lowest value and a highest value, where the highest value (or the lowest value) indicates that the first vector and the second vector are identical, while the lowest value (or the highest value) indicates that the first vector and the second vector are completely different, and a value between the highest value and the lowest value indicates varying levels of similarity between the first vector and the second vector. Alternatively, the similarity score might be any positive or negative scalar multiple or other transformation(s), or the like. In some cases, the threshold value might comprise a predetermined value(s) within the range or a value that is one of the following percentages of a difference between the highest value and the lowest value: 70%, 75%, 80%, 85%, 90%, 95%, or 99%, and/or the like.

For instance, the similarity score might be a decimal value ranging between 0 and 1, where a value of 1 might indicate that the first vector and the second vector are identical, while a value of 0 might indicate that the first vector and the second vector are completely different, and a value between 0 and 1 might indicate varying levels of similarity between the first vector and the second vector. In such cases, the threshold value might include, without limitation, one of 0.7, 0.75, 0.8, 0.85, 0.9, 0.95, or 0.99, and/or the like. Alternatively, the similarity score might be an integer value ranging between 0 and 100, where a value of 100 might indicate that the first vector and the second vector are identical, while a value of 0 might indicate that the first vector and the second vector are completely different, and a value between 0 and 100 might indicate varying levels of similarity between the first vector and the second vector. In such instances, the threshold value might include, but is not limited to, one of 70, 75, 80, 85, 90, 95, or 99, and/or the like. In yet another alternative embodiment, the similarity score might be an integer value ranging between −100 and 100, where a value of 100 might indicate that the first vector and the second vector are identical, while a value of −100 might indicate that the first vector and the second vector are completely different, and a value between −100 and 100 might indicate varying levels of similarity between the first vector and the second vector. In such cases, the threshold value might include, but is not limited to, one of 50, 55, 60, 65, 70, 75, 80, 85, 90, 95, 98, or 99, and/or the like. These are merely some non-limiting example implementations of the similarity score. The various embodiments are not limited to such implementations, and may be embodied by any suitable range of values indicative of identicalness at one end of the range, complete difference at the other end of the range, and varying degrees of similarity in between.

Figure 4C:
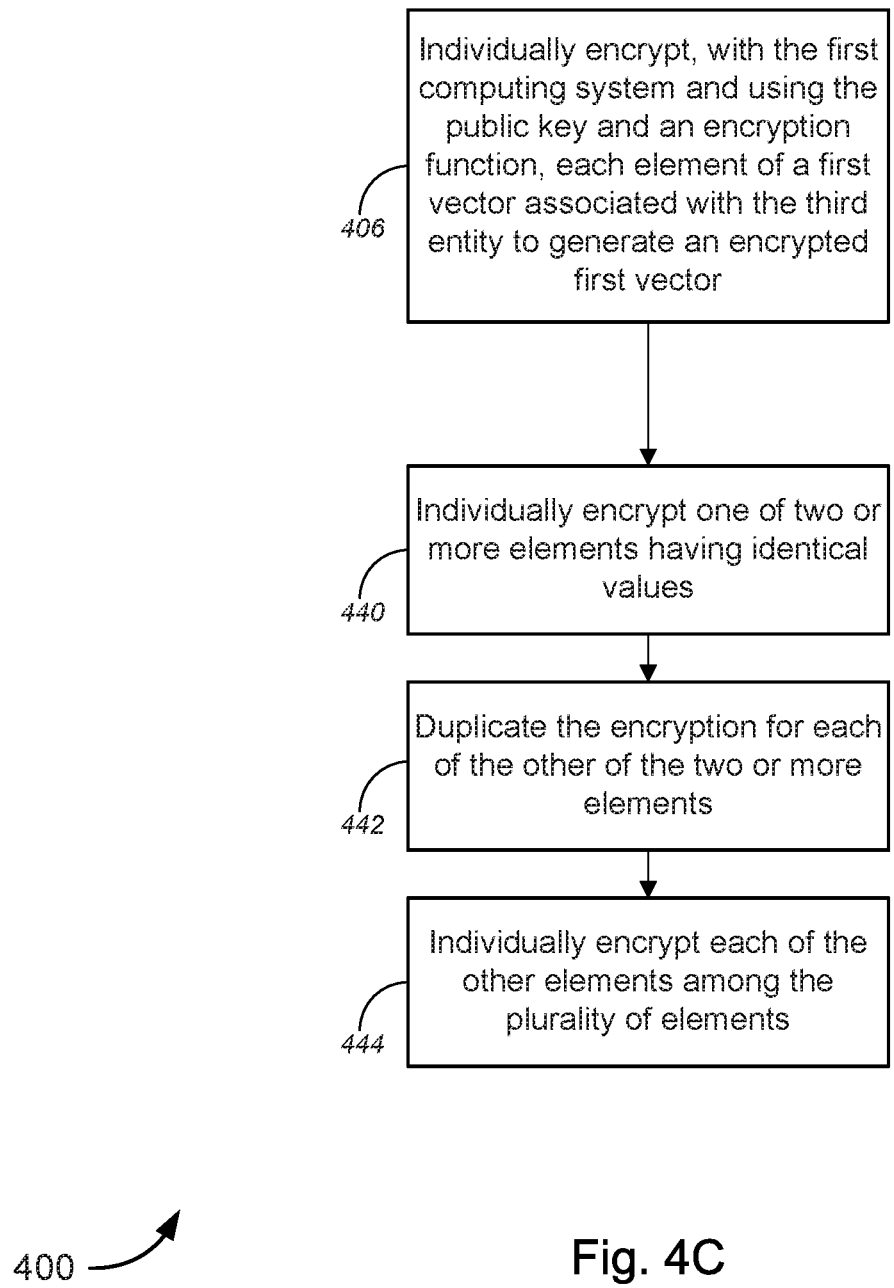

With reference to FIG. 4C, the first vector might comprise a plurality of elements including two or more elements having identical values. Individually encrypting each element of the first vector associated with the third entity to generate the encrypted first vector (at block 406) might comprise individually encrypting one of the two or more elements having identical values (block 440), duplicating the encryption for each of the other of the two or more elements (block 442), and individually encrypting each of the other elements among the plurality of elements (block 444).

Figure 4D:
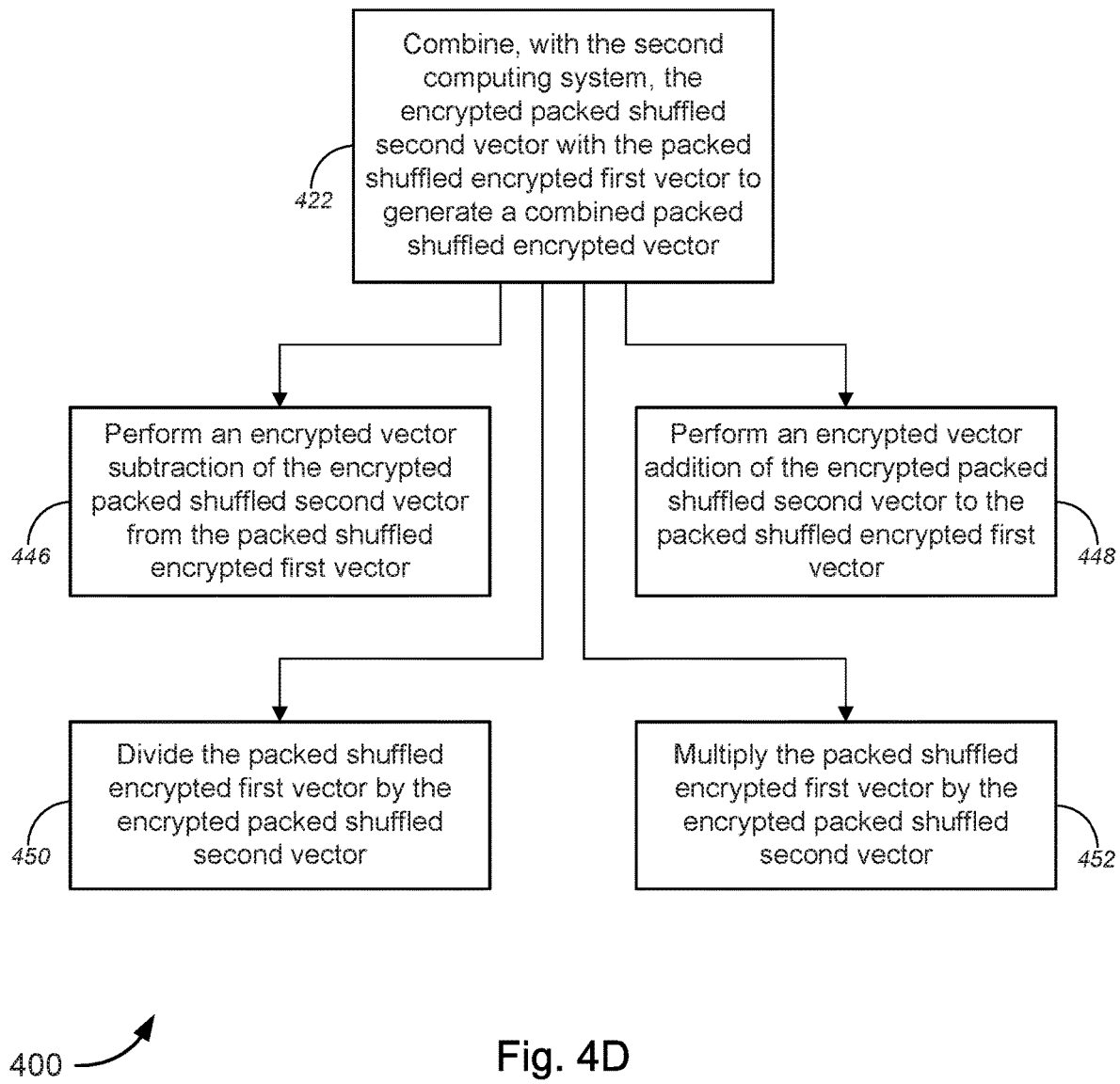

Referring to FIG. 4D, combining the encrypted packed shuffled second vector with the packed shuffled encrypted first vector to generate a combined packed shuffled encrypted vector (at block 422) might comprise at least one of performing an encrypted vector subtraction of the encrypted packed shuffled second vector from the packed shuffled encrypted first vector (block 446), performing an encrypted vector addition of the encrypted packed shuffled second vector to the packed shuffled encrypted first vector (block 448), dividing the packed shuffled encrypted first vector by the encrypted packed shuffled second vector (block 450), or multiplying the packed shuffled encrypted first vector by the encrypted packed shuffled second vector (block 452), and/or the like.

Exemplary System and Hardware Implementation

Figure 5:
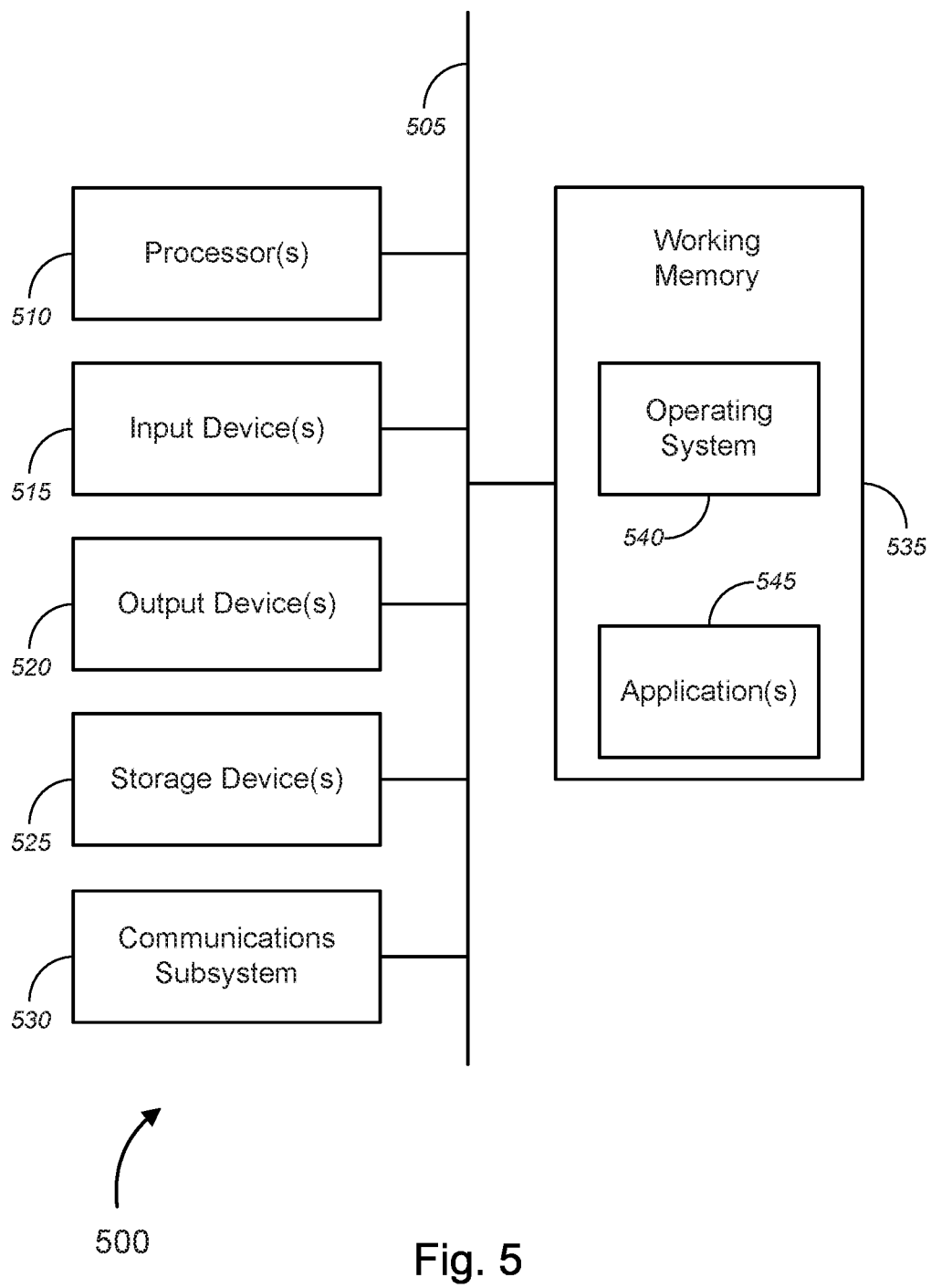
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., first computing system 105, second computing system 120, and user device 140, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., first computing system 105, second computing system 120, and user device 140, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
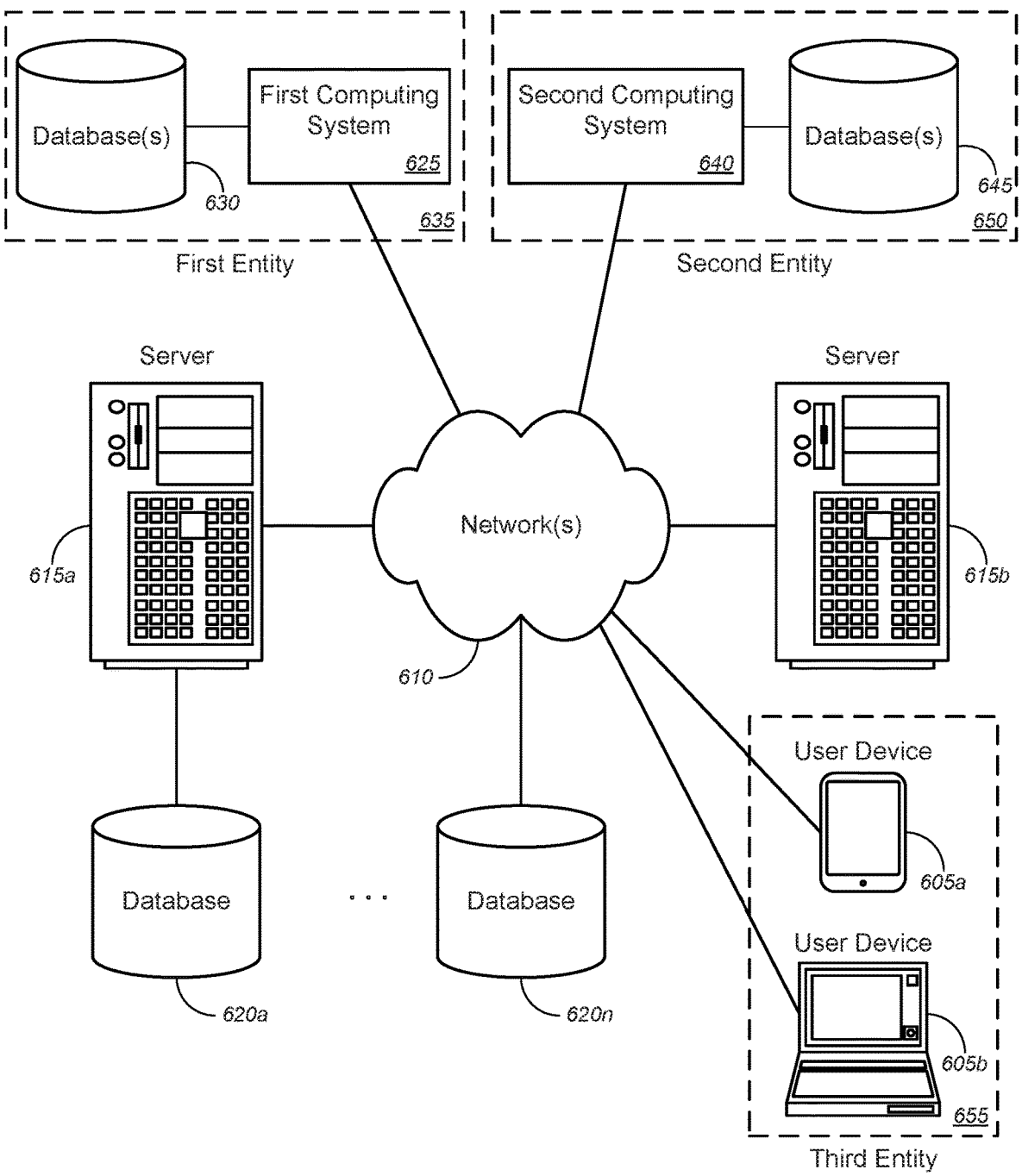
FIG. 6 is a block diagram illustrating a networked system of computers, computing systems, or system hardware architecture, which can be used in accordance with various embodiments.

As noted above, a set of embodiments comprises methods and systems for implementing signal encryption or signal authentication, and, more particularly, to methods, systems, and apparatuses for implementing signal encryption or signal authentication that enables measuring a distance or a similarity value between two fixed-length signals without disclosing the contents of the signals, particularly as the signals pertain to biometric signals or signals containing biometric data. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to network(s) 135 FIG. 1, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing signal encryption or signal authentication, and, more particularly, to methods, systems, and apparatuses for implementing signal encryption or signal authentication that enables measuring a distance or a similarity value between two fixed-length signals without disclosing the contents of the signals, particularly as the signals pertain to biometric signals or signals containing biometric data, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620*a*-620*n* (collectively, "databases 620"). The location of each of the databases 620 is discretionary: merely by way of example, a database 620*a* might reside on a storage medium local to (and/or resident in) a server 615*a* (and/or a user computer, user device, or customer device 605). Alternatively, a database 620*n* can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise first computing system 625 (similar to first computing system 105 of FIG. 1, or the like) and corresponding database(s) 630 (similar to database(s) 110 of FIG. 1, or the like), both associated with first entity 635 (similar to first entity 115 of FIG. 1, or the like). System 600 might further comprise second computing system 640 (similar to second computing system 120 of FIG. 1, or the like) and corresponding database(s) 645 (similar to database(s) 125 of FIG. 1, or the like), both associated with second entity 650 (similar to second entity 130 of FIG. 1, or the like). In some cases, user devices 605a and/or 605b (similar to user device 140 of FIG. 1, or the like) might be associated with third entity 655 (similar to third entity 150 of FIG. 1, or the like).

In operation, first computing system 625 might receive, from second computing system 640 (in some cases, via network(s) 610), a first request on behalf of second entity 650 or third entity 655. In some embodiments, the first request might include, but is not limited to, a request for access or authentication on behalf of a user, the second entity, or the third entity; a request to connect with the first computing system; a request to send data (e.g., combined packed shuffled encrypted vectors, or the like); or a request to perform one or more tasks; and/or the like. In some instances, the one or more tasks might include, but is not limited to, providing the user, the second entity, or the third entity with access to at least one of content, data, user profiles, devices, accounts, services, or financial assets, and/or the like; authenticating the user, the second entity, or the third entity; allowing the second computing system to send data (e.g., combined packed shuffled encrypted vectors, or the like); and/or the like. In some cases, first computing system 625 might generate an encryption key pair comprising a public key and a private key. The first computing system 625 might individually encrypt, using the public key and an encryption function, each element of a first vector associated with the third entity 655 to generate an encrypted first vector. The first computing system 625 might send the encrypted first vector and the public key to the second computing system 640, via network(s) 610.

The second computing system 640 might receive the encrypted first vector and the public key. The second computing system 640 might shuffle, using a permutation function, elements of a second vector associated with the third entity 655 to generate a shuffled second vector; might pack, using a packing function, two or more elements of the shuffled second vector to generate a packed shuffled second vector, the packed shuffled second vector having fewer elements than the shuffled second vector; might individually encrypt, using the received public key, each element of the packed shuffled second vector to generate an encrypted packed shuffled second vector; might shuffle, using the permutation function, corresponding elements of the encrypted first vector to generate a shuffled encrypted first vector; might pack, using the packing function, two or more elements of the shuffled encrypted first vector to generate a packed shuffled encrypted first vector, the two or more elements of the shuffled encrypted first vector corresponding to the two or more elements of the shuffled second vector; might combine the encrypted packed shuffled second vector with the packed shuffled encrypted first vector to generate a combined packed shuffled encrypted vector; and might send the combined packed shuffled encrypted vector to the first computing system 625, via network(s) 610.

The first computing system 625 might receive the combined packed shuffled encrypted vector; might individually decrypt, using the private key and a decryption function, each element of the combined packed shuffled encrypted vector to generate a combined packed shuffled decrypted vector; might unpack, using an unpacking function corresponding to the packing function, the combined packed shuffled decrypted vector to generate a combined shuffled decrypted vector; and might generate a similarity score based on the combined shuffled decrypted vector, the similarity score being indicative of differences between the second vector and the first vector. In some embodiments, based on a determination that the similarity score exceeds a threshold value, the first computing system 625 might perform one or more tasks in response to the first request. According to some embodiments, the one or more tasks might include, but is not limited to, providing the user, the second entity, or the third entity with access to at least one of content, data, user profiles, devices, accounts, services, or financial assets, and/or the like; authenticating the user, the second entity, or the third entity; allowing the second computing system to send data (e.g., combined packed shuffled encrypted vectors, or the like); and/or the like.

According to some embodiments, the first vector and the second vector might each comprise biometric data associated with the third entity, wherein the biometric data might include, without limitation, at least one of face pattern data, fingerprint pattern data, or iris pattern data, and/or the like. In some embodiments, the similarity score might include, but is not limited to, at least one of one or more decimal values, one or more integer values, or one or more ordinal values ranging between a lowest value and a highest value, where the highest value (or the lowest value) indicates that the first vector and the second vector are identical, while the lowest value (or the highest value) indicates that the first vector and the second vector are completely different, and a value between the highest value and the lowest value indicates varying levels of similarity between the first vector and the second vector. Alternatively, the similarity score might be any positive or negative scalar multiple or other transformation(s), or the like. In some cases, the threshold value might comprise a predetermined value(s) within the range or a value that is one of the following percentages of a difference between the highest value and the lowest value: 70%, 75%, 80%, 85%, 90%, 95%, or 99%, and/or the like.

For instance, the similarity score might be a decimal value ranging between 0 and 1, where a value of 1 might indicate that the first vector and the second vector are identical, while a value of 0 might indicate that the first vector and the second vector are completely different, and a value between 0 and 1 might indicate varying levels of similarity between the first vector and the second vector. In such instances, the threshold value might include, but is not limited to, one of 0.7, 0.75, 0.8, 0.85, 0.9, 0.95, or 0.99, and/or the like. Alternatively, the similarity score might be an integer value ranging between 0 and 100, where a value of 100 might indicate that the first vector and the second vector are identical, while a value of 0 might indicate that the first vector and the second vector are completely different, and a value between 0 and 100 might indicate varying levels of similarity between the first vector and the second vector. In such cases, the threshold value might include, but is not limited to, one of 70, 75, 80, 85, 90, 95, or 99, and/or the like. In yet another alternative embodiment, the similarity score might be an integer value ranging between −100 and 100, where a value of 100 might indicate that the first vector and the second vector are identical, while a value of −100 might indicate that the first vector and the second vector are completely different, and a value between −100 and 100 might indicate varying levels of similarity between the first vector and the second vector. In such instances, the threshold value might include, but is not limited to, one of 50, 55, 60, 65, 70, 75, 80, 85, 90, 95, 98, or 99, and/or the like. These are merely some non-limiting example implementations of the similarity score. The various embodiments are not limited to such implementations, and may be embodied by any suitable range of values indicative of identicalness at one end of the range, complete difference at the other end of the range, and varying degrees of similarity in between.

In some embodiments, the first entity might include, without limitation, one of a financial institution, a credit card company, a debit card company, a payment service provider, a content access service provider, an authentication service provider, a manufacturer of video management software, a supplier of video management software, an enterprise user of video management software, a manufacturer of embedded device cameras, a supplier of embedded device cameras, an enterprise user of embedded device cameras, a manufacturer of automotive vehicles, a supplier of automotive vehicles, an enterprise user of automotive vehicles, a manufacturer of access control devices, a supplier of access control devices, an enterprise user of access control devices, a manufacturer of self-service kiosks, a supplier of self-service kiosks, or an enterprise user of self-service kiosks, and/or the like. In some cases, the second entity might include, but is not limited to, one of a retailer, a financial end-use system service provider, an automated teller machine ("ATM") service provider, a purchase payment terminal service provider, a cryptography terminal service provider, a user of video management software, a supplier of video management software, a user of embedded device cameras, a supplier of embedded device cameras, a user of automotive vehicles, a supplier of automotive vehicles, a user of access control devices, a supplier of access control devices, a user of self-service kiosks, or a supplier of self-service kiosks, and/or the like. In some cases, the self-service kiosks might include, for example, kiosks for checkout, kiosks for payment, kiosks for travel-related interactions, kiosks for managing customer rewards, kiosks for special services, or kiosks for other purposes, and/or the like. The third entity might include, without limitation, one of a customer, a shopper, an access requester, an end-user, a user of video management software, a supplier of video management software, a user of embedded device cameras, a supplier of embedded device cameras, a user of automotive vehicles, a supplier of automotive vehicles, a user of access control devices, a supplier of access control devices, a user of self-service kiosks, or a supplier of self-service kiosks, and/or the like. In some instances, the second entity and the third entity might be the same entity.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method for implementing biometric signal encryption or authentication using optimizations for privacy-preserving distance metric computation of biometric signal data, comprising:

receiving, with a first computing system associated with a first entity and from a second computing system associated with a second entity, a first request for access or authentication on behalf of the second entity or a third entity;

generating, with the first computing system, an encryption key pair comprising a public key and a private key;

individually encrypting, with the first computing system and using the public key and an encryption function, each element of a first vector associated with the third entity to generate an encrypted first vector;

sending, with the first computing system, the encrypted first vector and the public key to the second computing system;

receiving, with the second computing system, the encrypted first vector and the public key;

shuffling, with the second computing system and using a permutation function, elements of a second vector associated with the third entity to generate a shuffled second vector;

packing, with the second computing system and using a packing function, two or more elements of the shuffled second vector to generate a packed shuffled second vector, the packed shuffled second vector having fewer elements than the shuffled second vector;

individually encrypting, with the second computing system and using the received public key, each element of the packed shuffled second vector to generate an encrypted packed shuffled second vector;

shuffling, with the second computing system and using the permutation function, corresponding elements of the encrypted first vector to generate a shuffled encrypted first vector;

packing, with the second computing system and using the packing function, two or more elements of the shuffled encrypted first vector to generate a packed shuffled encrypted first vector, the two or more elements of the shuffled encrypted first vector corresponding to the two or more elements of the shuffled second vector;

combining, with the second computing system, the encrypted packed shuffled second vector with the packed shuffled encrypted first vector to generate a combined packed shuffled encrypted vector;

sending, with the second computing system, the combined packed shuffled encrypted vector to the first computing system;

receiving, with the first computing system, the combined packed shuffled encrypted vector;
individually decrypting, with the first computing system and using the private key and a decryption function, each element of the combined packed shuffled encrypted vector to generate a combined packed shuffled decrypted vector;
unpacking, with the first computing system and using an unpacking function corresponding to the packing function, the combined packed shuffled decrypted vector to generate a combined shuffled decrypted vector;
generating, with the first computing system, a similarity score based on the combined shuffled decrypted vector, the similarity score being indicative of differences between the second vector and the first vector; and
based on a determination that the similarity score exceeds a threshold value, performing, with the first computing system, one or more tasks in response to the first request;
wherein if the first vector comprises a plurality of elements comprising two or more elements having identical values, individually encrypting each element of the first vector associated with the third entity to generate the encrypted first vector comprises individually encrypting one of the two or more elements having identical values, duplicating the encryption for each of the other of the two or more elements, and individually encrypting each of the other elements among the plurality of elements;
wherein at least one of the first vector or the second vector comprises biometric data associated with the third entity, wherein the biometric data comprises at least one of face pattern data, fingerprint pattern data, or iris pattern data, wherein the at least one of the first vector or the second vector is a mathematical representation as a multi-dimensional vector of the third entity's unique identity based on physical characteristics represented by the biometric data associated with the third entity.

2. A method for implementing biometric signal encryption or authentication using optimizations for privacy-preserving distance metric computation of biometric signal data, comprising:
receiving, from a first computing system associated with a first entity and using a second computing system associated with a second entity, an encrypted first vector and a generated public key in response to sending a first request for access or authentication to the first computing system on behalf of the second entity or a third entity;
shuffling, with the second computing system and using a permutation function, elements of the second vector to generate a shuffled second vector;
packing, with the second computing system and using a packing function, two or more elements of the shuffled second vector to generate a packed shuffled second vector, the packed shuffled second vector having fewer elements than the shuffled second vector;
individually encrypting, with the second computing system and using the received generated public key, each element of the packed shuffled second vector to generate an encrypted packed shuffled second vector;
shuffling, with the second computing system and using the permutation function, corresponding elements of the encrypted first vector to generate a shuffled encrypted first vector;
packing, with the second computing system and using the packing function, two or more elements of the shuffled encrypted first vector to generate a packed shuffled encrypted first vector, the two or more elements of the shuffled encrypted first vector corresponding to the two or more elements of the shuffled second vector;
combining, with the second computing system, the encrypted packed shuffled second vector with the packed shuffled encrypted first vector to generate a combined packed shuffled encrypted vector; and
sending, with the second computing system, the combined packed shuffled encrypted vector to the first computing system for the first computing system to generate a similarity score that is indicative of differences between the second vector and the first vector;
wherein at least one of the first vector or the second vector comprises biometric data associated with the third entity, wherein the biometric data comprises at least one of face pattern data, fingerprint pattern data, or iris pattern data, wherein the at least one of the first vector or the second vector is a mathematical representation as a multi-dimensional vector of the third entity's unique identity based on physical characteristics represented by the biometric data associated with the third entity.

3. The method of claim 2, further comprising:
receiving, with the first computing system associated with the first entity and from the second computing system associated with the second entity, the first request on behalf of the second entity or the third entity;
individually encrypting, with the first computing system and using an encryption function and the generated public key, each element of a first vector associated with the third entity to generate the encrypted first vector;
sending, with the first computing system, the encrypted first vector and the generated public key to the second computing system;
receiving, with the first computing system and from the second computing system, the combined packed shuffled encrypted vector;
individually decrypting, with the first computing system and using a decryption function and a generated private key corresponding to the generated public key, each element of the combined packed shuffled encrypted vector to generate a combined packed shuffled decrypted vector;
unpacking, with the first computing system and using an unpacking function, the combined packed shuffled decrypted vector to generate a combined shuffled decrypted vector;
generating, with the first computing system, the similarity score based on the combined shuffled decrypted vector; and
based on a determination that the similarity score exceeds a threshold value, performing, with the first computing system, one or more tasks in response to the first request.

4. The method of claim 3, further comprising:
generating, with the first computing system, an encryption key pair comprising the generated public key and the generated private key.

5. The method of claim 2, wherein shuffling the elements and corresponding elements of the second vector and the encrypted first vector using the permutation function comprises randomly or pseudo-randomly shuffling the elements and corresponding elements of the second vector and the encrypted first vector using the permutation.

6. The method of claim 2, wherein combining the encrypted packed shuffled second vector with the packed shuffled encrypted first vector comprises at least one of performing an encrypted vector subtraction of the encrypted packed shuffled second vector from the packed shuffled encrypted first vector, performing an encrypted vector addition of the encrypted packed shuffled second vector to the packed shuffled encrypted first vector, dividing the packed shuffled encrypted first vector by the encrypted packed shuffled second vector, or multiplying the packed shuffled encrypted first vector by the encrypted packed shuffled second vector.

7. The method of claim 2, wherein the first vector comprises a plurality of elements comprising two or more elements having identical values, wherein individually encrypting each element of the first vector associated with the third entity to generate the encrypted first vector comprises individually encrypting one of the two or more elements having identical values, duplicating the encryption for each of the other of the two or more elements, and individually encrypting each of the other elements among the plurality of elements.

8. The method of claim 2, wherein the similarity score comprises at least one of one or more decimal values, one or more integer values, or one or more ordinal values ranging between a lowest value and a highest value, where the highest value indicates that the first vector and the second vector are identical, while the lowest value indicates that the first vector and the second vector are completely different, and a value between the highest value and the lowest value indicates varying levels of similarity between the first vector and the second vector.

9. The method of claim 8, wherein the threshold value comprises a value that is one of the following percentages of a difference between the highest value and the lowest value: 70%, 75%, 80%, 85%, 90%, 95%, or 99%.

10. The method of claim 2, wherein the first entity comprises one of a financial institution, a credit card company, a debit card company, a payment service provider, a content access service provider, an authentication service provider, a manufacturer of video management software, a supplier of video management software, an enterprise user of video management software, a manufacturer of embedded device cameras, a supplier of embedded device cameras, an enterprise user of embedded device cameras, a manufacturer of automotive vehicles, a supplier of automotive vehicles, an enterprise user of automotive vehicles, a manufacturer of access control devices, a supplier of access control devices, an enterprise user of access control devices, a manufacturer of self-service kiosks, a supplier of self-service kiosks, or an enterprise user of self-service kiosks.

11. The method of claim 2, wherein the second entity comprises one of a retailer, a financial end-use system service provider, an automated teller machine ("ATM") service provider, a purchase payment terminal service provider, a cryptography terminal service provider, a user of video management software, a supplier of video management software, a user of embedded device cameras, a supplier of embedded device cameras, a user of automotive vehicles, a supplier of automotive vehicles, a user of access control devices, a supplier of access control devices, a user of self-service kiosks, or a supplier of self-service kiosks, and wherein the third entity comprises one of a customer, a shopper, an access requester, an end-user, a user of video management software, a supplier of video management software, a user of embedded device cameras, a supplier of embedded device cameras, a user of automotive vehicles, a supplier of automotive vehicles, a user of access control devices, a supplier of access control devices, a user of self-service kiosks, or a supplier of self-service kiosks.

12. The method of claim 2, wherein the second entity and the third entity are the same entity.

13. The method of claim 2, further comprising:
dividing, with the second computing system, the second vector into the two or more elements, prior to packing the two or more elements of the second vector.

14. A system for implementing biometric signal encryption or authentication using optimizations for privacy-preserving distance metric computation of biometric signal data, comprising:
a first computing system associated with a first entity, the first computing system comprising:
at least one first processor; and
a first non-transitory computer readable medium communicatively coupled to the at least one first processor, the first non-transitory computer readable medium having stored thereon computer software comprising a first set of instructions that, when executed by the at least one first processor, causes the first computing system to:
send an encrypted first vector and a generated public key to a second computing system associated with a second entity in response to receiving a first request for access or authentication from the first computing system on behalf of the second entity or a third entity;
the second computing system associated with the second entity, the second computing system comprising:
at least one second processor; and
a second non-transitory computer readable medium communicatively coupled to the at least one second processor, the second non-transitory computer readable medium having stored thereon computer software comprising a second set of instructions that, when executed by the at least one second processor, causes the second computing system to:
receive, from the first computing system, the encrypted first vector and the generated public key in response to sending the first request for access or authentication to the first computing system on behalf of the second entity or a third entity;
shuffle, using a permutation function, elements of the second vector to generate a shuffled second vector;
pack, using a packing function, two or more elements of the shuffled second vector to generate a packed shuffled second vector, the packed shuffled second vector having fewer elements than the shuffled second vector;
individually encrypt, using the received generated public key, each element of the packed shuffled second vector to generate an encrypted packed shuffled second vector;
shuffle, using the permutation function, corresponding elements of the encrypted first vector to generate a shuffled encrypted first vector;
pack, using the packing function, two or more elements of the shuffled encrypted first vector to generate a packed shuffled encrypted first vector, the two or more elements of the shuffled encrypted first vector corresponding to the two or more elements of the shuffled second vector;
combine the encrypted packed shuffled second vector with the packed shuffled encrypted first vector to generate a combined packed shuffled encrypted vector; and send the combined packed shuffled encrypted vector to the first computing system for the first computing system to generate a similarity score that is indicative of differences between the second vector and the first vector;

wherein at least one of the first vector or the second vector comprises biometric data associated with the third entity, wherein the biometric data comprises at least one of face pattern data, fingerprint pattern data, or iris pattern data, wherein the at least one of the first vector or the second vector is a mathematical representation as a multi-dimensional vector of the third entity's unique identity based on physical characteristics represented by the biometric data associated with the third entity.

15. The system of claim 14, wherein combining the encrypted packed shuffled second vector with the packed shuffled encrypted first vector comprises at least one of performing an encrypted vector subtraction of the encrypted packed shuffled second vector from the packed shuffled encrypted first vector, performing an encrypted vector addition of the encrypted packed shuffled second vector to the packed shuffled encrypted first vector, dividing the packed shuffled encrypted first vector by the encrypted packed shuffled second vector, or multiplying the packed shuffled encrypted first vector by the encrypted packed shuffled second vector.

16. The system of claim 14, wherein the first vector comprises a plurality of elements comprising two or more elements having identical values, wherein individually encrypting each element of the first vector associated with the third entity to generate the encrypted first vector comprises individually encrypting one of the two or more elements having identical values, duplicating the encryption for each of the other of the two or more elements, and individually encrypting each of the other elements among the plurality of elements.

17. The system of claim 14, wherein the first entity comprises one of a financial institution, a credit card company, a debit card company, a payment service provider, a content access service provider, an authentication service provider, a manufacturer of video management software, a supplier of video management software, an enterprise user of video management software, a manufacturer of embedded device cameras, a supplier of embedded device cameras, an enterprise user of embedded device cameras, a manufacturer of automotive vehicles, a supplier of automotive vehicles, an enterprise user of automotive vehicles, a manufacturer of access control devices, a supplier of access control devices, an enterprise user of access control devices, a manufacturer of self-service kiosks, a supplier of self-service kiosks, or an enterprise user of self-service kiosks, wherein the second entity comprises one of a retailer, a financial end-use system service provider, an automated teller machine ("ATM") service provider, a purchase payment terminal service provider, a cryptography terminal service provider, a user of video management software, a supplier of video management software, a user of embedded device cameras, a supplier of embedded device cameras, a user of automotive vehicles, a supplier of automotive vehicles, a user of access control devices, a supplier of access control devices, a user of self-service kiosks, or a supplier of self-service kiosks, and wherein the third entity comprises one of a customer, a shopper, an access requester, an end-user, a user of video management software, a supplier of video management software, a user of embedded device cameras, a supplier of embedded device cameras, a user of automotive vehicles, a supplier of automotive vehicles, a user of access control devices, a supplier of access control devices, a user of self-service kiosks, or a supplier of self-service kiosks.

18. A method for implementing biometric signal encryption or authentication using optimizations for privacy-preserving distance metric computation of biometric signal data, comprising:

receiving, with a first computing system associated with a first entity and from a second computing system associated with a second entity, a first request for access or authentication on behalf of the second entity or a third entity;

individually encrypting, with the first computing system and using a generated public key and an encryption function, a first vector associated with the third entity to generate an encrypted first vector, by:
individually encrypting, with the first computing system and using the generated public key and the encryption function, one of two or more elements of the first vector having identical values;
duplicating, with the first computing system, the encryption for each of the other of the two or more elements; and
individually encrypting, with the first computing system and using the generated public key and the encryption function, each of the other elements of the first vector; and sending, with the first computing system, the encrypted first vector and the generated public key to the second computing system for the second computing system to generate a combined packed shuffled encrypted vector that can be used by the first computing system to generate a similarity score that is indicative of differences between the first vector and a second vector associated with the third entity, wherein generating the combined packed shuffled encrypted vector comprises shuffling each of the first and second vectors to generate shuffled first and second vectors, packing two or more elements of the shuffled first and second vectors to generate packed shuffled first and second vectors, individually encrypting each element of the packed shuffled first and second vectors to generated encrypted packed shuffled first and second vectors, and combining the encrypted packed shuffled first and second vectors to generate the combined packed shuffled encrypted vector;

wherein at least one of the first vector or the second vector comprises biometric data associated with the third entity, wherein the biometric data comprises at least one of face pattern data, fingerprint pattern data, or iris pattern data, wherein the at least one of the first vector or the second vector is a mathematical representation as a multi-dimensional vector of the third entity's unique identity based on physical characteristics represented by the biometric data associated with the third entity.

* * * * *